United States Patent
Mueller

(10) Patent No.: US 10,285,247 B2
(45) Date of Patent: May 7, 2019

(54) CONTROL INSTALLATION FOR A LIGHTING SYSTEM AND METHOD FOR CONFIGURING AND PUTTING INTO SERVICE SAID CONTROL INSTALLATION

(71) Applicant: ITZ Innovations- und Technologiezentrum GmbH, Arnsberg (DE)

(72) Inventor: Sven Mueller, Froenenberg (DE)

(73) Assignee: ITZ INNOVATIONS- UND TECHNOLOGIEZENTRUM GMBH, Arnsberg (DE)

( * ) Notice: Subject to any disclaimer, the term of this patent is extended or adjusted under 35 U.S.C. 154(b) by 0 days.

(21) Appl. No.: 15/329,838

(22) PCT Filed: May 5, 2015

(86) PCT No.: PCT/EP2015/059874
§ 371 (c)(1),
(2) Date: Jul. 5, 2017

(87) PCT Pub. No.: WO2016/015886
PCT Pub. Date: Feb. 4, 2016

(65) Prior Publication Data
US 2017/0311421 A1    Oct. 26, 2017

(30) Foreign Application Priority Data
Jul. 28, 2014    (DE) .................. 10 2014 110 581

(51) Int. Cl.
*H05B 37/00*    (2006.01)
*H05B 37/02*    (2006.01)
*G08C 17/02*    (2006.01)

(52) U.S. Cl.
CPC ....... *H05B 37/0272* (2013.01); *H05B 37/029* (2013.01); *H05B 37/0227* (2013.01); *G08C 17/02* (2013.01)

(58) Field of Classification Search
CPC ............ H05B 37/0272; H05B 37/0227; H05B 37/029
See application file for complete search history.

(56) References Cited

U.S. PATENT DOCUMENTS 5,986,414 A * 11/1999 Bocchicchio ........ H05B 37/029
315/312
7,889,051 B1 * 2/2011 Billig .................. H04L 12/2818
340/5.23
(Continued)

FOREIGN PATENT DOCUMENTS

DE    102007025126    12/2008
DE    102009056152    6/2011
(Continued)

OTHER PUBLICATIONS

PCT International Search Report dated Jul. 24, 2015, received in corresponding PCT Application No. PCT/EP2015/059874. English translation attached.
(Continued)

*Primary Examiner* — Thomas D Alunkal
(74) *Attorney, Agent, or Firm* — Grossman, Tucker, Pereault & Pfleger, PLLC

(57) ABSTRACT

The invention relates to a control system for a lighting system comprising at least one control adapter having a digital interface for connection to an assigned digital control bus, to which a plurality of light-technology operating components such as control gear, ballast devices, sensor units, and/or switch units are connectable as bus users by means of a respective digital interface, wherein the at least one control adapter furthermore has a controller and a
(Continued)

wireless interface for data coupling of the control adapter to a wireless network terminal. The control facility according to the invention is distinguished in that for at least one lighting system template, the respective comprised light-technology operating components and at least some of configurations and/or parameterizations assigned to the operating components are stored in a memory, which can be read out by the wireless network terminal, wherein the bus users connected to the digital control bus are detected for the configuration and startup of the lighting system. The invention furthermore relates to a method for the configuration and startup of such a facility.

21 Claims, 16 Drawing Sheets

(56) References Cited

U.S. PATENT DOCUMENTS

| | | | | |
|---|---|---|---|---|
| 2004/0105264 A1* | 6/2004 | Spero | ...................... | B60Q 1/04 362/276 |
| 2011/0204824 A1* | 8/2011 | Sims | .................... | H05B 37/029 315/312 |
| 2013/0193878 A1* | 8/2013 | Zimmermann | .... | H05B 33/0842 315/307 |
| 2014/0265568 A1* | 9/2014 | Crafts | ...................... | H02J 4/00 307/24 |
| 2015/0088775 A1* | 3/2015 | McIntire | .............. | G06Q 50/265 705/325 |

FOREIGN PATENT DOCUMENTS

| | | |
|---|---|---|
| DE | 102010031242 | 9/2011 |
| EP | 1643815 | 4/2006 |
| EP | 2512209 | 10/2012 |
| WO | 2006/033062 | 3/2006 |

OTHER PUBLICATIONS

English translation of International Preliminary Report on Patentability dated Feb. 9, 2017, received in corresponding PCT Application No. PCT/EP2015/059874.

* cited by examiner

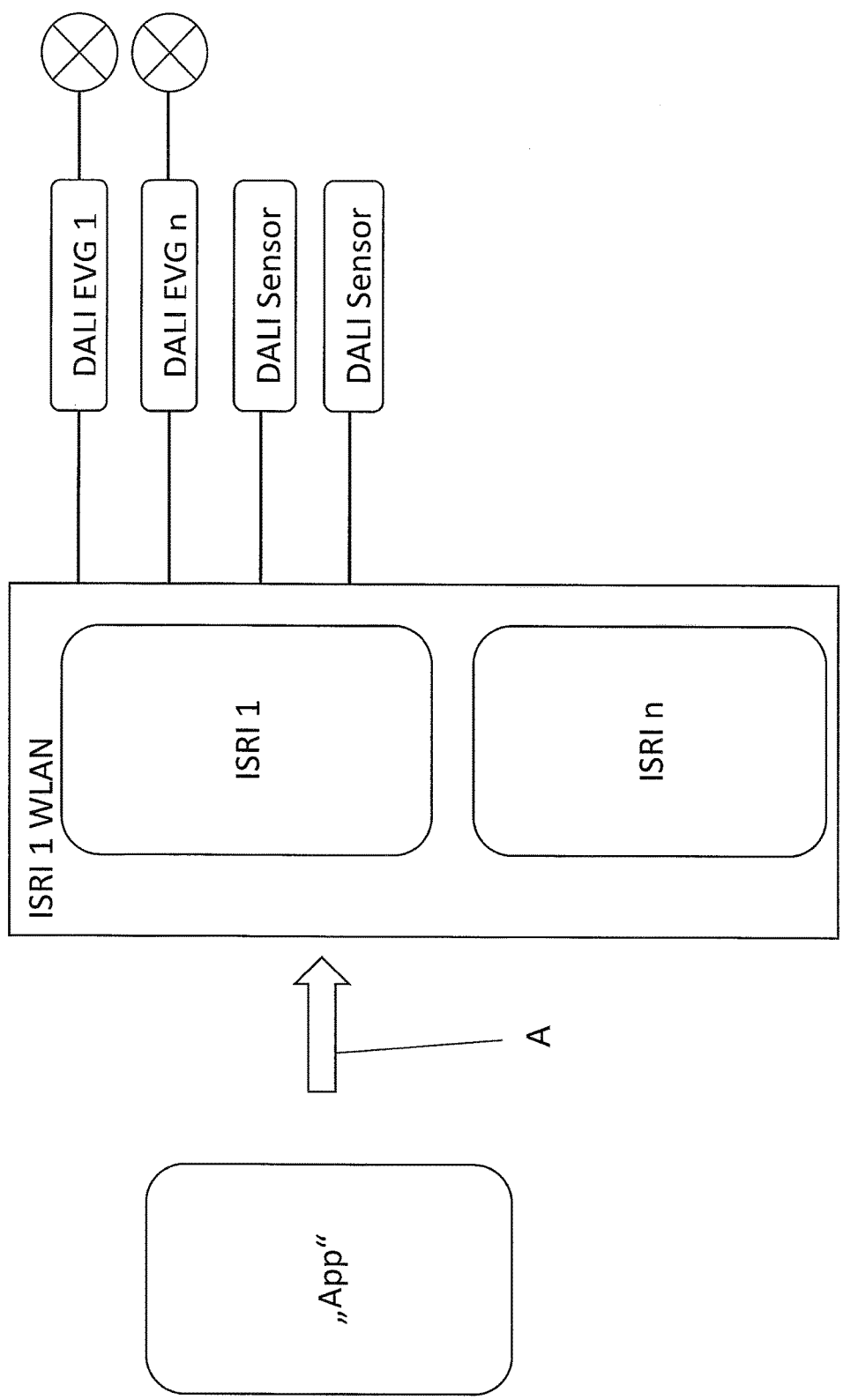

CONTROL INSTALLATION FOR A LIGHTING SYSTEM AND METHOD FOR CONFIGURING AND PUTTING INTO SERVICE SAID CONTROL INSTALLATION

FIELD

The invention relates to a control facility for a lighting system, comprising at least one control adapter having a digital interface for connection to an assigned digital control bus, to which a plurality of light-technology operating components, such as control gear, ballast devices, sensor units, and/or switch units, are connectable by means of a respective digital interface as bus users. The at least one control adapter furthermore has a controller and a wireless interface for data coupling of the control adapter to a wireless network terminal, such as a smartphone, tablet, or PC. The invention furthermore relates to a method for the configuration and startup of such a control facility.

BACKGROUND

Such a facility is disclosed, for example, in European published application EP 2 512 209 A2. Such a facility offers, in particular for complex lighting systems, which can also extend in principle over multiple rooms or halls, a high level of flexibility for adapting the control facility to the respective specific lighting task, which is to cover greatly varying demands within such a lighting system.

In the field of lighting systems, various digital control buses are known, wherein the so-called DALI (digital addressable lighting interface) interface has become established in the meantime as a quasi-standard, both in the commercial field and also in the private field. A DALI system is described, for example, in published application EP 1 643 815. Up to 64 light-technology devices such as lights, sensor units, or switch units such as buttons can be connected to a single bus via a DALI control unit, which is also referred to as a DALI master, so that the configuration and parameterization of such a lighting system can become complex and thus time-consuming in practice. The complexity of the system, in particular during the configuration, can increase arbitrarily in principle if, as described in the indicated published application, multiple control adapters are interconnected for the control of a plurality of lights by means of a network.

SUMMARY

The invention is based on the object of embodying a conventional control facility for a lighting system so that the configuration and parameterization of the facility and/or the associated lighting system is simplified.

The invention achieves this object with regard to the device by the provision of a memory, in which, for at least one lighting system template, the respective comprised light-technology operating components and at least some of the configurations and/or parameterizations associated with the operating components are stored in a memory, which can be read out by the wireless network/terminal, wherein all bus users connected to the digital control bus are detected for the configuration and startup of the lighting system.

The term control facility comprises all components which are used to control the lighting system, the lighting system itself comprises all lights of the installation and the control facility.

In this case, for example, the control adapter can be caused to scan the bus users and/or light-technology operating components which are connected to the assigned digital bus, such as a DALI bus. After this scanning of the digital bus, the bus users and/or light-technology operating components connected thereto can be addressed directly by the control adapter, in particular by specifying a respective assigned address, wherein the communication to the control adapter can also be set up as bidirectional depending on the operating component. The at least one lighting system template can be predetermined and can be used as the basis for a subsequent further configuration/assignment of the components and/or parameterization of the lighting system, whereby the configuration and/or startup of the lighting system are substantially facilitated.

In one refinement, the control facility according to the invention can be designed so that for a plurality of lighting system templates, the respective comprised light-technology operating components and at least some of the configurations and/or parameterizations assigned to the operating components are stored. In this case, the memory can be read out by the wireless network terminal, wherein, for the configuration and startup of the lighting system, all bus users connected to the digital control bus are detected and, by comparison of the detected operating components to the operating components stored for the lighting system templates, a lighting system template can be ascertained in a computer-assisted manner, which is used as the basis for the more extensive or subsequent configuration and/or parameterization of the lighting system.

In this case, as indicated above, the control adapter can be caused to scan the bus users connected to the assigned DALI bus. The operating components thus detected can then be compared to the operating components stored for the lighting system templates in a computer-assisted manner and the lighting system template can be found which has the greatest overlaps with respect to the operating components thereof. The lighting system template thus found can, as in the first-described embodiment, be used as the basis for the subsequent configuration such as grouping, assignment, and/or parameterization of operating components of the lighting system. A grouping of operating components can be, for example, the logical linkage of a button or a dimmer to a light or the logical linkage of a light sensor to a light or also the combination of a plurality of lights.

The control facility designed according to the invention can greatly facilitate the configuration and the startup of complex lighting systems in particular, because this can be performed at least partially automatically in this embodiment.

The memory for storing the light-technology operating components respectively comprised by at least one or the plurality of lighting system templates and at least some of the configurations and/or parameterizations assigned to the operating components can advantageously be arranged in the wireless network terminal, such as a smartphone or a notebook. In this way, downloading one or the plurality of lighting system templates, for example, from an Internet server by way of the wireless network terminal, is superfluous. For example, the at least one lighting system template can advantageously be stored on this terminal together with the program code, in particular an app for controlling the sequence of the configuration and/or the startup. In this embodiment, the program code including the lighting system template(s) therefore only has to be stored a single time on the terminal and is subsequently available for the configuration and/or the operation of the control facility.

It can advantageously also be provided that the wireless network terminal is configured to configure and/or establish a data connection to a server, such as a Web server, to download information about one or a plurality of lighting system templates from the server onto a memory of the wireless network terminal or to transmit data of a configured lighting system to a higher-order data server, so that arbitrary lighting system templates can be provided on the wireless network terminal for configuring the lighting system and/or a configured lighting system is available for other applications or users as a lighting system template.

It can advantageously also be provided that the output file of a light planning program, either directly or after appropriate adaptation of the output file as a lighting system template, is stored on a server such as a Web server, to which the wireless network terminal has data access.

The wireless network terminal can advantageously be set up, in particular by a corresponding program code or app, to input target values and/or functionalities for detected operating components for configuring the lighting system, which can subsequently be stored in the at least one control adapter for operation of the lighting system. For example, the function of a wall switch can be defined or also a switch-light assignment can be carried out by the user via this. In a similar manner, it can also be provided that lighting scenes such as a time sequence of a lighting are set via the terminal, for example, in the case of turning on a light in response, i.e., as a response to the signal of a presence sensor, which indicates the presence of a person.

According to the invention, it can be provided that lighting situations such as one or more dimming levels of a light or a group of lights are set via the terminal, for example, in response, i.e., as a response to the signal of a light sensor and/or as a function of the purpose of the lighting, for example, for a video presentation or for the purpose of carrying out a written test of a large number of users. In addition, in a lowermost operating level, the terminal can also be configured to control the actual operation of the lighting system, for example, manually at the terminal and to trigger buttons or switches actuable via a control bus. These buttons or switches can also advantageously be directly manually triggered.

The control facility according to the invention can comprise a single control adapter and the digital control bus connected thereto, to which a plurality of operating components is connected. In particular for complex lighting systems, which have a large number of operating components and/or extend over multiple rooms or halls, the control facility according to the invention can also have a plurality of such control adapters, each having a digital interface for connection to an assigned digital control bus. Fundamentally, these control adapters can be constructed identically on the device side, in particular such that each one acts as the master on the assigned digital control bus and controls the communication on the assigned bus, in particular according to the IEC 62386 standard, i.e., as a DALI bus.

In principle, a predefined number, in particular all control adapters of the control facility according to the invention can be networked in the scope of a wireless network, for example, designed according to the IEEE 802.11 standard as a WLAN network. However, it is also in the scope of the invention to execute the networking of the control adapters or a data coupling to the terminal by means of other wireless network standards, for example, ZigBee, 6LowPAN, etc., or as an inhomogeneous network structure having a coupling of such different wireless networks, wherein one part of the control adapters is coupled, for example, via a first wireless network standard and other control adapters are coupled via another wireless network standard.

The specific design of the wireless network can be adapted to the respective lighting system. For example, it is possible that all control adapters of the control facility designed according to the invention are configured as clients, which are coupled via a predefined base station (wireless access point) to a predefined wireless network. In addition, it is also possible, for example, that a control adapter is configured as a base station, to which other control adapters are coupled as wireless clients. In this case, the control adapters of the control facility according to the invention can form a separate wireless network or can be connected as described to a specified wireless network, for example, a company wireless network. It is also possible in the scope of the invention to provide such a wireless network, comprising a plurality of such control adapters, via an adapter, which either provides a correspondingly configured control adapter having an additional LAN interface or another router for coupling into LAN, for example, a company LAN. In a further embodiment, it can also be provided that the control facility according to the invention comprises a plurality of independent wireless networks, which each have a plurality of the described control adapters, wherein the wireless network terminal can be designed to dial into all of these networks.

It can furthermore be provided that a control adapter is configured as a base station or hotspot for each of these wireless networks. If the respective control buses are designed as DALI buses, the assigned control adapters can be configured as DALI masters and can thus carry out the communication and the control of the maximum 64 operating components connected to the assigned DALI bus.

The object on which the invention is based is additionally achieved by a method for the configuration and/or startup of a control facility for a lighting system, comprising at least one control adapter having a digital interface for connection to an assigned digital control bus, to which a plurality of light-technology operating components such as control gear or ballast devices for operating lighting means, sensor units, and/or switch units are connected by means of a respective digital interface as bus users, wherein the at least one control adapter furthermore has a controller and a wireless interface for data coupling of the control adapter to a wireless network terminal. The method according to the invention is characterized by the following steps:
  setting up a wireless network, comprising the at least one control adapter, as an active wireless network user, in particular as an access point, router, or client;
  detecting the light-technology operating components connected to the digital control bus of a control adapter, in particular for each control adapter which is active in the wireless network; and
  configuring and/or parameterizing the lighting system according to a stored lighting system template.

Before beginning the method according to the invention, in general the wiring of the lighting system is carried out. The method according to the invention can thus be performed in a processor-assisted manner on a wireless network terminal and additionally by manual inputs of a user via the wireless network terminal on the basis of a stored lighting system template, whereby the configuration and/or startup of a control facility for a lighting system is simplified. Using the method according to the invention, by using at least one predefined and stored lighting system template, at least a part of the configuration work can be taken from the user. It can also be provided in this case that the user selects the lighting system template, according to which or on the basis of which the configuration of the lighting system is carried out, manually from a plurality of predefined and stored lighting system templates.

Specifications about a geometrical room design, such as the arrangement of at least one window façade, specifications about the arrangement of at least one door, specifications about the number and/or the geometric arrangement of groups of lights within the room, specifications about the number and/or the geometric arrangement of sensor units, specifications about the number and/or the geometric arrangement of switch units within the room, and/or specifications about lighting scenes can advantageously be stored in the at least one lighting system template. These items of information can also be used in particular to visualize the lighting system template on a display screen of the wireless network terminal.

The visualization of the lighting system template on a display screen of the wireless network terminal can advantageously be used to facilitate the assignment of the light-technology operating components of the lighting system to the light-technology operating components of the stored lighting system template and subsequently for further configuration or parameterization of the light-technology operating components of the lighting system.

It can be advantageous if not only items of information for at least one lighting system template are used for the visualization on the wireless network terminal, but rather also a visualization of the detected light-technology operating components, which are connected to the digital control bus of the at least one control adapter, is also performed on the wireless network terminal, in particular both together on an in particular shared display screen of the wireless network terminal. In this case, for example, carried out manually by simple "drag-and-drop" by the user, a facilitated assignment of the light-technology operating components of the lighting system detected by the respective control adapter to the light-technology operating components of the at least one lighting system template can be carried out on a touch-sensitive display screen of the terminal or by means of an input unit. It can be provided that a user marks or selects a light-technology operating unit, which is displayed on the display screen and detected on the digital bus, such as a light or an operating device of a light, a sensor, or a switch unit, wherein it is thereupon activated by the configuration program such as an app on the wireless network terminal for signaling. The user can therefore assign the operating components of the real lighting system to the respective operating components of a lighting system template and can establish this assignment, for example, by a "drag-and-drop" input on the display screen for the further configuration of the lighting system and/or communicate it to the program.

The signaling of the respective operating component after the selection or marking on the display screen can be carried out in the case of control gear of lights and/or lights by simple energizing of the respective illuminant, in the case of sensors and/or switches, for example, by activating a respective signaling LED, which is provided on the sensor or switch.

In a similar manner, the further configuration and/or parameterization of the light-technology operating components of the lighting system can be facilitated, for example, with regard to the input of setting parameters for presence sensors and light sensors, dimming levels for control gear or lights and/or light groups, the setting of lighting situations and lighting scenes, etc.

In another refining embodiment of the method according to the invention, it can have the following further steps:
  comparing the ascertained lighting system construction, in particular with respect to the control adapter comprised in the wireless network and the operating components assigned thereto via the respective digital control bus, to a plurality of stored lighting system templates according to predetermined criteria;
  in response to the comparison, selecting a lighting system template, wherein the configuration and/or parameterization of the lighting system is carried out according to the selected lighting system template.

Using this refinement, the method according to the invention can be performed after the wiring or the installation of the lighting system and the detection of the light-technology operating components connected to the at least one control adapter via a digital bus, either completely processor-supported on a wireless network terminal, in certain circumstances supplemented by manual inputs of a user via the wireless network terminal, whereby the configuration and/or startup of a control facility for a lighting system is greatly simplified or the configuration and startup of more complicated control facilities or lighting systems is enabled for the first time. Using the method according to the invention, a majority of the configuration work can frequently be taken from the user by the use of lighting system templates, wherein the possible complexity of an existing lighting system can remain concealed to the user.

The step of selecting a lighting system template for the subsequent or more extensive configuration and/or parameterization of the lighting system can preferably be preceded by the step in which the lighting system template is ascertained, which has the greatest correspondences with the ascertained construction of the present lighting system. In this case, a predetermined criterion can be, for example, the number of the detected light-technology operating components and/or the type of these operating components of the lighting system to be configured. For example, the system can obtain suggestions, on the basis of items of information about the type of the lights and/or of switches, sensors, etc., about which of the stored lighting system templates comes into consideration and thereupon can select one of the stored lighting system templates solely in a processor-assisted manner or in consideration of additional manual inputs of the user and the further configuration and/or parameterization of the existing lighting system can be based thereon.

To already provide the user with a possibility for manual input at a lower configuration level, in one special embodiment it can be provided that the step of selecting a lighting system template is preceded by the step in which a plurality of stored lighting system templates having the greatest correspondences according to the predetermined criteria is ascertained and a listing of lighting system templates is carried out according to the extent of the correspondence in relation to the predetermined criteria and displayed to the user for selection. This can be performed, for example, on a display screen on the wireless network terminal, on which the user then selects the lighting system template on which the further configuration of the existing lighting system and/or the existing control facility is based.

In this case, the respective detection of the light-technology operating components connected to the assigned control bus of a control adapter can be carried out by a DALI scan on the respective control bus which is initiated by the control adapter as the DALI master. The operating components thus ascertained can then be transmitted from the control adapter by means of a data connection via the wireless network to the wireless network terminal, from which the configuration and/or startup of the control facility can be carried out. In this case, the performance of the DALI scan can be requested from the wireless network terminal at the respective DALI control adapter.

The further configuration and/or parameterization of the lighting system can comprise, for example, setting predefined target values, such as dimming values, sensor values, etc., but also grouping a plurality of lights or lights in sensors and/or lights with switch units, such as buttons.

The setup of a wireless network for the control facility according to the invention can advantageously comprise the scanning of a predefined wireless network frequency range to ascertain wireless network users, which are configured as a base station (wireless access point) or wireless router, and are recognizable in terms of data as control adapters, in particular by specification of a unique identifier assigned to a control adapter; furthermore the selection of a subset or all ascertained control adapters and configuration of the ascertained control adapters as a wireless network user associated with a specific wireless network. For this purpose, it can be provided that all control adapters of the control facility are initially configured as a base station (wireless access point) or hotspot and a WLAN scan is carried out by the wireless network terminal to detect the available base stations or control adapters. Thereupon, the setup of a single one or multiple wireless networks each having assigned control adapters can be carried out as a function of the desired wireless network infrastructure. This wireless network structure can be adapted to the respective lighting system, for example, in the form of a mesh structure according to IEEE 802.11s, of a single wireless network, in which one control adapter is configured as a base station and the other control adapters are configured as clients, or in the form of the arrangement of a plurality of subnetworks, which each relate, for example, to a single room or a single hall, wherein these subnetworks can either be independent of one another or can be coupled to one another via a higher-order WLAN.

The selection of control adapters for assignment to a specific wireless network or subnetwork for each ascertained control adapter can advantageously comprise the following steps:
  displaying the ascertained control adapter on a display screen by way of an assigned symbol, in particular on a display screen of the wireless network terminal;
  marking of the symbol assigned to the control adapter on the display screen by a user;
  activating the control adapter marked on the display screen to emit an optical and/or acoustic signal, in particular at the control adapter itself or by operating components such as electronic ballasts which power lights or lamps, and which are connected to the digital control bus of the control adapter;
  in response to a detected signal: selecting of the control adapter by a user as a control adapter associated with the wireless network part, wherein in response to a non-detected signal, the respective control adapter is selected by the user as a control adapter which is not associated with the wireless network part.

By way of the specified method steps, a user can recognize optically or acoustically, respectively, the control adapters located within his visual and/or auditory perception range, for example, a room, and/or the operating components connected via the respective assigned control bus, so that the control adapter can be selected as associated with a predefined wireless network.

Such a procedure can be advantageous, for example, in those cases in which light-technology operating components located in a room or a hall are interconnected in a shared network by networking the assigned control adapters, wherein the entire control facility can have a single such network or also multiple such networks or subnetworks, wherein the latter can comprise the control adapters located in a single room or a hall.

Specific configurations of such a network are advantageous for the control facility according to the invention. For example, all selected control adapters can be reconfigured for a network client, wherein a single control adapter can still remain configured as a base station and therefore can be used as an access point or hotspot for the clients, i.e., in the case of a WLAN according to the IEEE 802.11 standard for eight clients, for example. If the digital control bus is designed as a DALI bus, such a network can comprise a total of 9×64=576 light-technology operating components such as control gear and/or ballast devices for lights, switches, electronic ballasts, sensors, etc., which can each be connected to one of the nine DALI buses via an associated DALI interface.

To prevent unauthorized parties from intruding into a wireless network constructed as described above, it can advantageously be provided that the authenticity of an ascertained control adapter is verified during the configuration of a wireless network of the control facility, in particular by user input or reading in and checking a public key assigned to the control adapter. This public key can be checked in the control adapter itself, for example, so that in this embodiment each control adapter authenticates itself. A device-specific certificate can be stored in each control adapter for this purpose, the public key can be attached externally on the housing of the control adapter for reading or scanning, for example. The method according to the invention can be designed in this case such that the selection of a control adapter as a control adapter associated with the wireless network is only possible by a user input or automatically by a program after the verification of the authenticity of the control adapter has been carried out.

The public key can advantageously be carried out, for example, by an alphanumeric input of the user or by a QR scanning by the user. In another embodiment, it can also be provided that the public key is loaded from a secure site, for example, from a secured Web server directly onto the wireless network terminal, so that it is available for checking the authenticity of the respective control adapter.

In one particularly secure embodiment, it can also be provided that components of the control facility according to the invention have access to a so-called public key infrastructure (PKI), i.e., access to a system which can issue, distribute, and check digital certificates. An otherwise necessary user action in the form of an input or, for example, in the form of reading in a QR code can be omitted in this embodiment, so that, on the one hand, the probability of the occurrence of errors during the user input and, on the other hand, security in relation to unauthorized intrusion into the control facility is increased by such an embodiment of the method according to the invention.

It can advantageously be provided in the method according to the invention that after the finishing of the configuration and/or parameterization of the lighting system, data of this newly administered lighting system are used to update and/or expand a stored lighting system template, so that these items of information can be used during a subsequent configuration and/or startup of a control facility for a lighting system. Furthermore, it can be provided that after the finishing of the administration, configuration and/or parameterization data of this lighting system are stored as a further lighting system template, in particular in a publicly accessible Web server, from which the lighting system templates can be downloaded into a wireless network terminal.

The invention furthermore relates to a wireless network terminal and a control adapter for a control facility according to the invention and/or for carrying out a method for the configuration and/or startup of a control facility for a lighting system, wherein both the wireless network terminal and also the control adapter have a storage medium, on which a respective program code for carrying out the method according to the invention is stored.

The wireless network terminal has in this case at least one display screen, an input unit, and a controller, which is formed by the program code stored in the storage medium and running in the controller for the described configuration and/or startup and/or for the operation of the control facility. In this case, software code can run on the terminal like a smartphone for communication with the control adapters, generally based on the protocol of TCP/UDP in conjunction with an encryption. A further possibility is the setup of a communication based on a TCP server/client connection, in particular utilizing a conventional protocol, for example, XML over REST. In addition, in such a TCP server/client connection between the terminal and a control adapter, the protocol JSON over REST can be used, wherein the latter protocol is particularly well suitable for app development on netbooks/smartphones with regard to its readability, and furthermore assigned parser engines already exist, which facilitates the software development.

It can advantageously be provided that the communication between the control adapter or adapters and the wireless network terminal is carried out, for example, via SSL, whereby a user-specific access control having secured transfer can be provided. In this case, in one embodiment variant, the respective passwords of the authorized users and the IP addresses, which the respective user can access, can be stored in the control adapter or adapters. The respective control adapter can carry out the authentication of the wireless network terminal by the control generation of a hash key by means of the password stored in its memory.

Program code running on the terminal also provides, in addition to the communication with the control adapters, the actual control of the method according to the invention, the graphic user interface (GUI) for the user. In addition, a program module can also be provided for updating program code, in particular for carrying out the method according to the invention, for example, for connection to a web browser, which provides this information for download onto the terminal. Furthermore, the terminal can have a Web server, via which control adapters can download respective software updates. For this purpose, the app running on the terminal can inform the respective control adapter about the update.

Firstly, program modules for providing a master functionality for the digital bus, for example, the DALI bus according to IEC 62386 are stored on the control adapter. As a function of the types of the light-technology operating components connected to the respective digital control bus, the grouping thereof, the set lighting scenes and lighting situations, i.e., as a function of the configuration and/or parameterization of the lighting system, the assigned program code modules can be placed or interconnected on the basis of a modular approach to form an adapted application on the respective control adapter. In this manner, in the respective control adapter, control program code adapted to the operating components connected thereto and to the configuration of the system is stored. The program modules adapted for a predefined configuration of the bus users connected to the control bus can be downloaded in this case in one embodiment by the control adapter from the Web server, which can be provided by the wireless network terminal as described.

In particular, sensors can trigger lighting effects at lights by means of freely interconnectable program modules, wherein by way of the modular approach, various modules can be interconnected with one another or, in the event of a regrouping of the operating components, for example, due to the specification of other input parameters, the modularly constructed program can be adapted.

For communication between individual control adapters, they can each also comprise a Web server, wherein the communication via the wireless network, for example, a WLAN, can be carried out by means of the hypertext transfer protocol (HTTP). The data transport for the application is generally performed in this case via TCP/IP.

As recognized by a person skilled in the art, the control facility according to the invention for a lighting system generally does not have a central control unit, instead the control intelligence of the facility is distributed over all control adapters. A failure of individual components therefore cannot result in the failure of the entire control facility according to the invention in any case.

BRIEF DESCRIPTION OF THE DRAWINGS

The control facility according to the invention and/or the method according to the invention for administration of a control facility for a lighting system and/or for the operation thereof will be explained by the description of several embodiments with reference to the appended figures.

FIGS. 7a-c show the sequence steps 400, 500 of the illustration according to FIG. 6 from a software viewpoint;

DETAILED DESCRIPTION

The following description of the invention relates to a design of the control facility according to the invention for a lighting system, in which the control adapters are integrated into a WLAN network according to the IEEE 802.11 standard and EN 300328 and in addition the control adapters are designed as DALI Masters according to the IEC 62386 standard and are configured to control the light-technology DALI operating components connected to the respective DALI bus. The invention is not restricted in this case to the use of specific types of DALI operating components.

Figure 1:
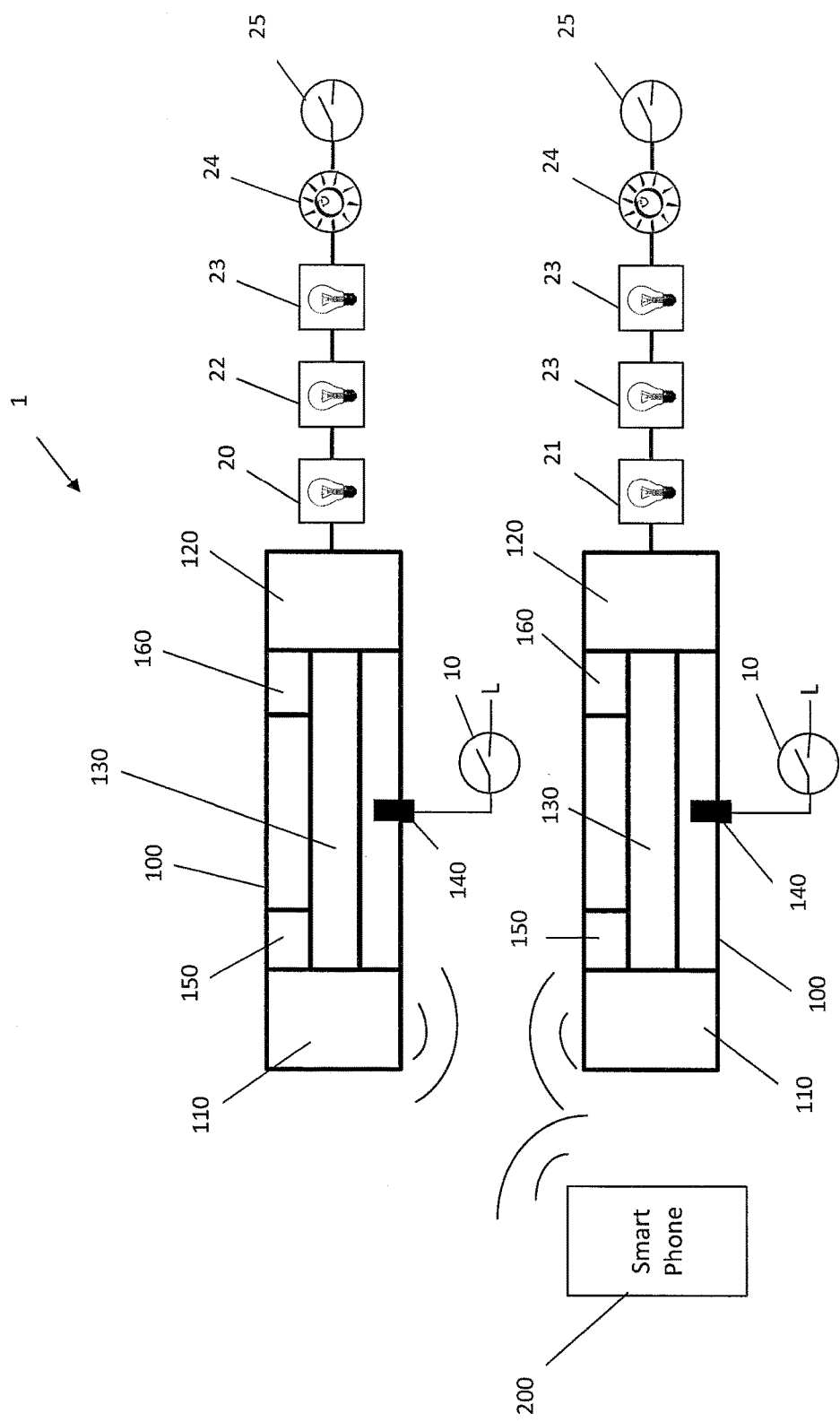
FIG. 1 shows a schematic sketch of a control facility for a lighting system.

FIG. 1 shows a schematic illustration of such a control facility 1, comprising two control adapters 100, which each have, on the one hand, a WLAN module 110 for coupling to a WLAN network, a DALI module 120 for coupling to a DALI control bus, a controller 130, and a button input 140, which is connectable to a button 10. Different light-technology operating components are connectable using a DALI interface to the respective DALI buses via corresponding digital interfaces as bus users, such as lights 20-23 or the control gear or ballast devices thereof, sensors 24, switches 25, etc. Furthermore, the control adapters 100 shown in FIG. 1 comprise a system clock unit 150 and an expansion module 160. This expansion module provides further input/output terminals and associated driver units, for example, in the form of a USB terminal or a further wireless transceiver such as a ZigBee transceiver or 6LowPAN transceiver. In the described embodiment, a WLAN terminal in the form of a smartphone 200 is provided for the configuration and/or startup and also for the central input of operating parameters.

The described embodiment of the control facility 1 enables the administration via a central and mobile device via the smartphone 200. In the described embodiment, the WLAN module is designed as a network access module in accordance with the two layers for transmission and security according to the OSI layer model, the software for this purpose (TCP/IP layers, Internet, transport, and applications) runs via the controller 130. In the described embodiment, the system clock unit 150 is a structural unit separate from the controller 130, however, it can also be part of the controller and/or the assigned processor.

The DALI module 120 provides the DALI master for the connected digital control bus and is thus set up to physically apply the data to the bus corresponding to the DALI standard, furthermore it is set up to implement DALI commands, address chunks, switching, dimming, scenes, groups, and fading times. The controller 130 processes program code and in particular additionally provides the following functionalities such as the network nodes for the WLAN, the management of the communication between the respective control adapter 100 and the smartphone 200, in particular in the scope of a TCP server/client connection using the protocol JSON over REST, diverse regulating algorithms for operational control of the operating components connected to the respective DALI bus, a required data storage in reference to light scenes, groups of operating components, description of the control adapter, and a device list. In addition, the controller is set up to distribute updates, in particular OTA (over the air) updates for the WLAN module, the controller itself, the connected sensor devices, and/or in certain circumstances the expansion module 160.

In the described embodiment, the control adapters 100 are set up to control in principle all DALI-compatible sensor and actuator units, i.e., all DALI device types, such as lights, light sensors, movement sensors, buttons, value encoders such as dimmers, etc., ballast devices, or also operating components for color converters.

The software update of a control adapter can be carried out in the present case via the app running in the smartphone, for example, in that the present version of the control adapter is read out by the app. The app can inform the control adapter about a possible update and furthermore where the update can be downloaded via a Web server of the smartphone. The control adapter or the smartphone downloads the update, wherein the update is applied after successful, verified download in the control adapter, the new software can start thereafter. Upon the restart, the original settings, in particular groups and parameterizations of the operating components connected to the respective DALI bus, are advantageously assumed.

Figure 2:
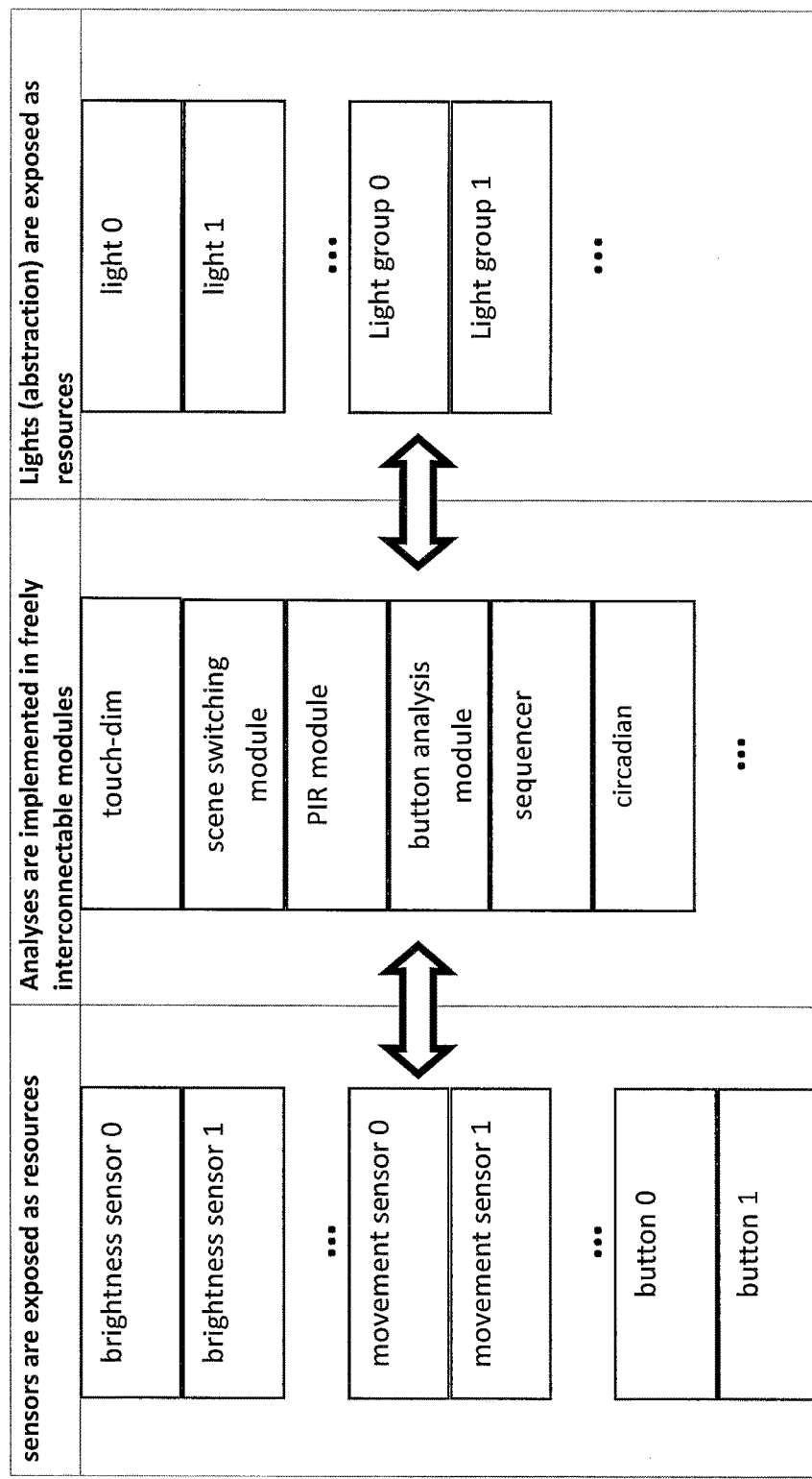
FIG. 2 shows a software concept implemented in a control adapter according to the invention having freely interconnectable software modules in a schematic sketch.

Upon an observation of the control adapter with regard to the control software implemented thereon for connected DALI operating components, in the described embodiment of the method according to the invention, the concept of freely interconnectable (software) modules is implemented, on the basis of which its sensors trigger effects on connected lights in operation. This fundamental concept is illustrated in FIG. 2, wherein sensors and lights are each exposed as resources, which transmit output parameters to the interconnected application modules, which control the lights on the output side. As is recognizable, the application of the control adapter for controlling the connected DALI operating components can be assembled as a function of the sensors and actuators used (in particular lights and/or ballast devices) by the respective modular program parts.

Figure 3:
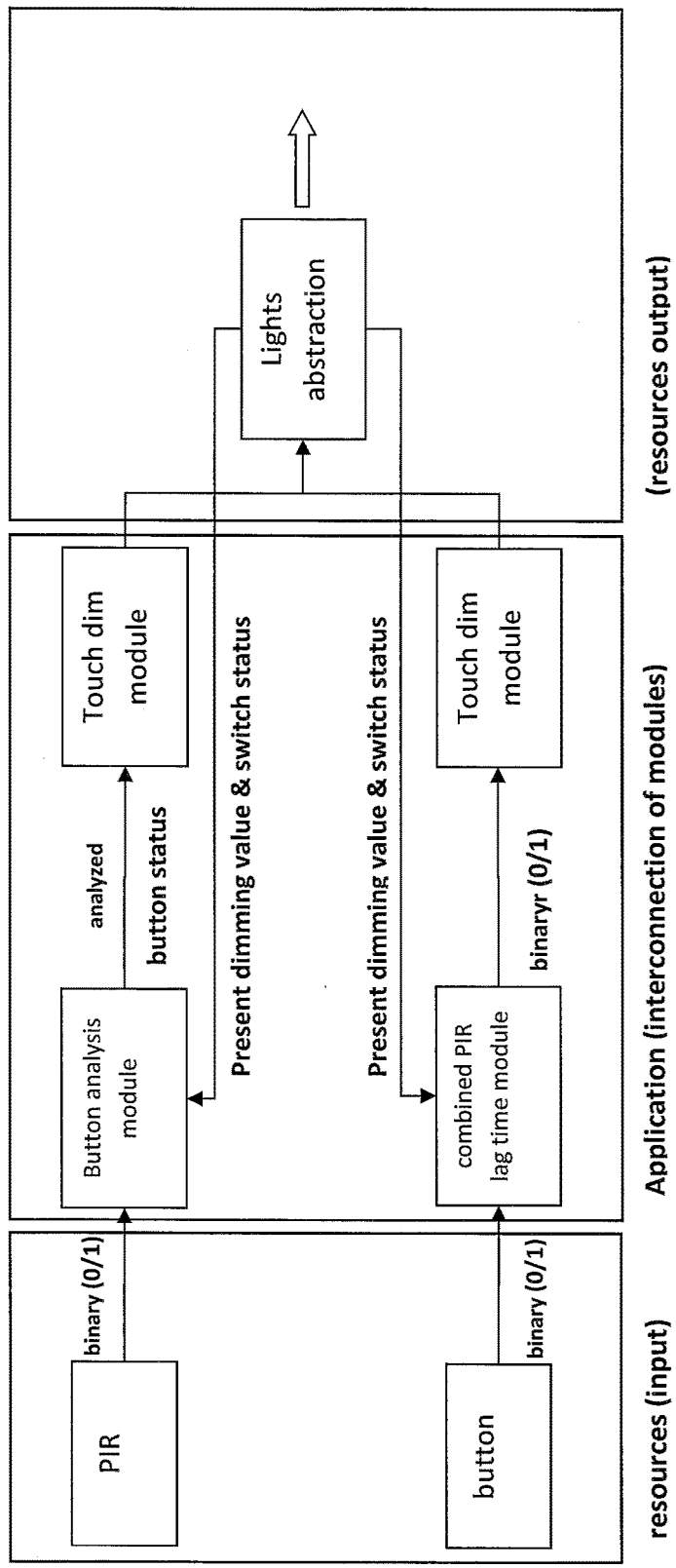
FIG. 3 shows an exemplary interconnection of software modules for the control adapter.

FIG. 3 shows such a specific construction of an application by interconnection of a plurality of software modules in a control adapter 100 according to the invention for a system having a presence detector (PIR) and a scanner, wherein a presence detection is linked to a touch dimming functionality. As long as the presence of a user is indicated, the degree of dimming can be changed by pressing the button using this interconnection. For this purpose, the corresponding DALI command is generated in the program part "resources (output)" and output via the DALI module 120.

In general, such a software module can be provided for some, in particular for each light-technology operating component or for one or more functions of such an operating component, wherein the software modules are assembled to provide a predefined operational control of the respective control adapter and are stored in the control adapter as an operating program. The assembly of these software modules and/or the storage in the assigned control adapter can be carried out and/or controlled after the finishing of the configuration from the wireless network terminal.

Figure 4:
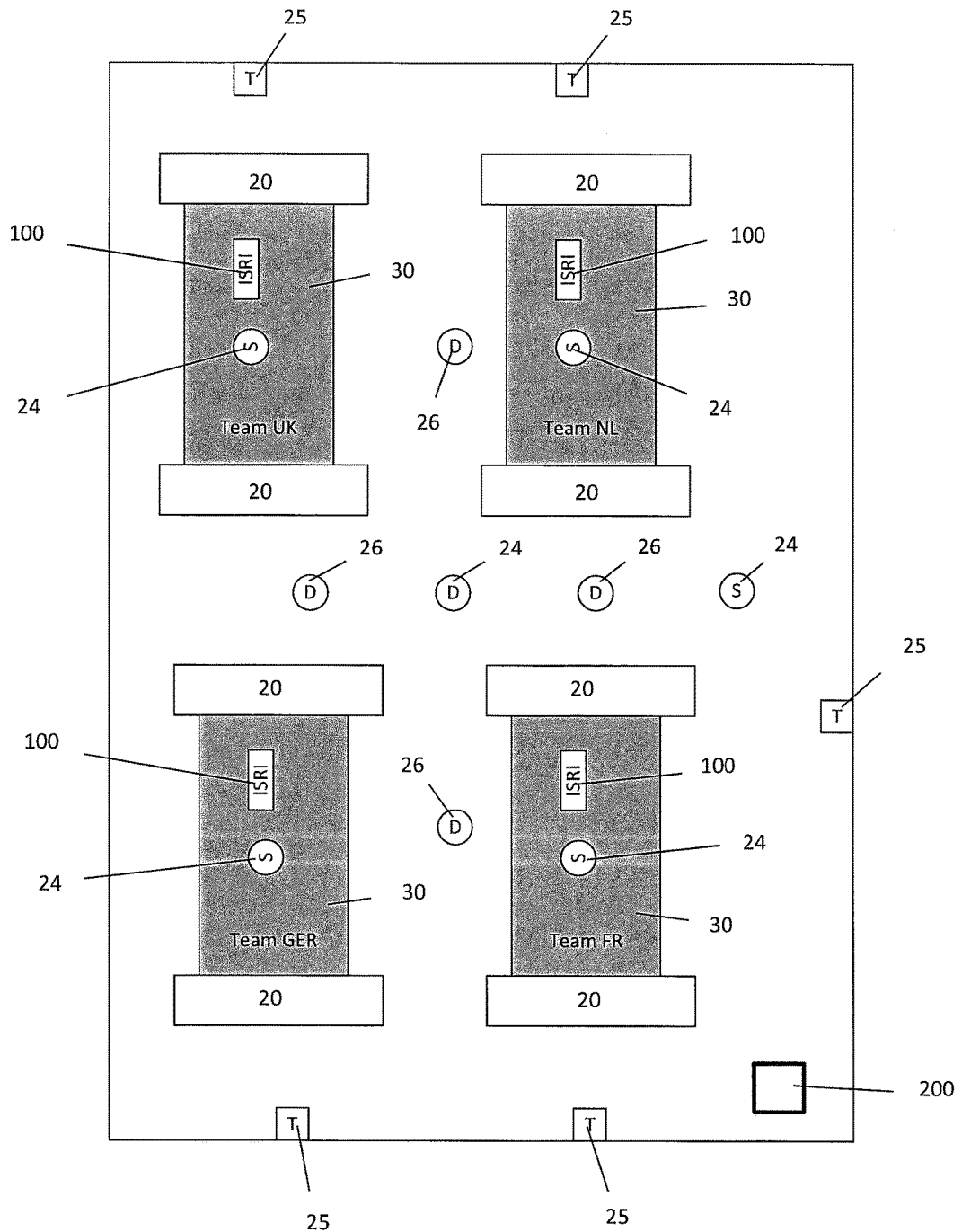
FIG. 4 shows a lighting system template as an example with respect to the configuration thereof in a schematic sketch.
Figure 5:
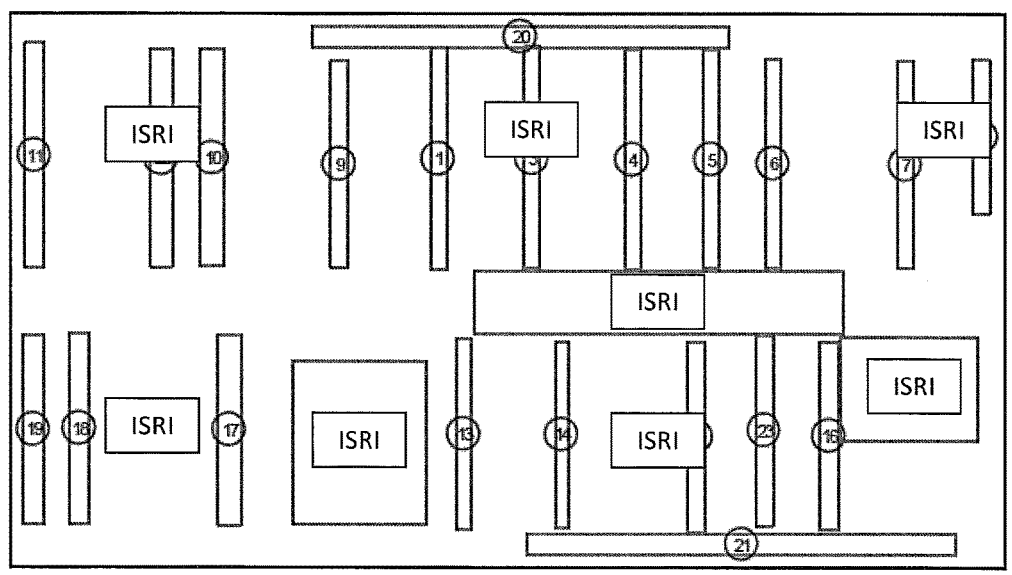
FIG. 5 shows a further lighting system template as an example with respect to the configuration thereof in a schematic sketch.

FIGS. 4 and 5 show, in a schematic diagram, exemplary lighting systems having control facilities designed according to the invention, which can be administered according to the method according to the invention, i.e., configured, parameterized, and/or put into operation or operated. In this case, FIG. 4 shows the fundamental construction of a lighting system in the case of an open-plan office, comprising a plurality of control adapters 100, lights 20 for illuminating desk regions 30, switches and/or buttons 25, light sensors 24, and presence sensors 26. FIG. 5 shows the exemplary construction of a lighting system for the floor of a business, for example, a construction market, comprising a plurality of control adapters identified with the reference signs ISRI and respective assigned DALI operating components such as lights, buttons, switches, light sensors, and presence sensors. The systems generally comprise operating components, for example, lights and sensors, which are selected specifically for the respective application, for example, high ceilings.

Figure 6:
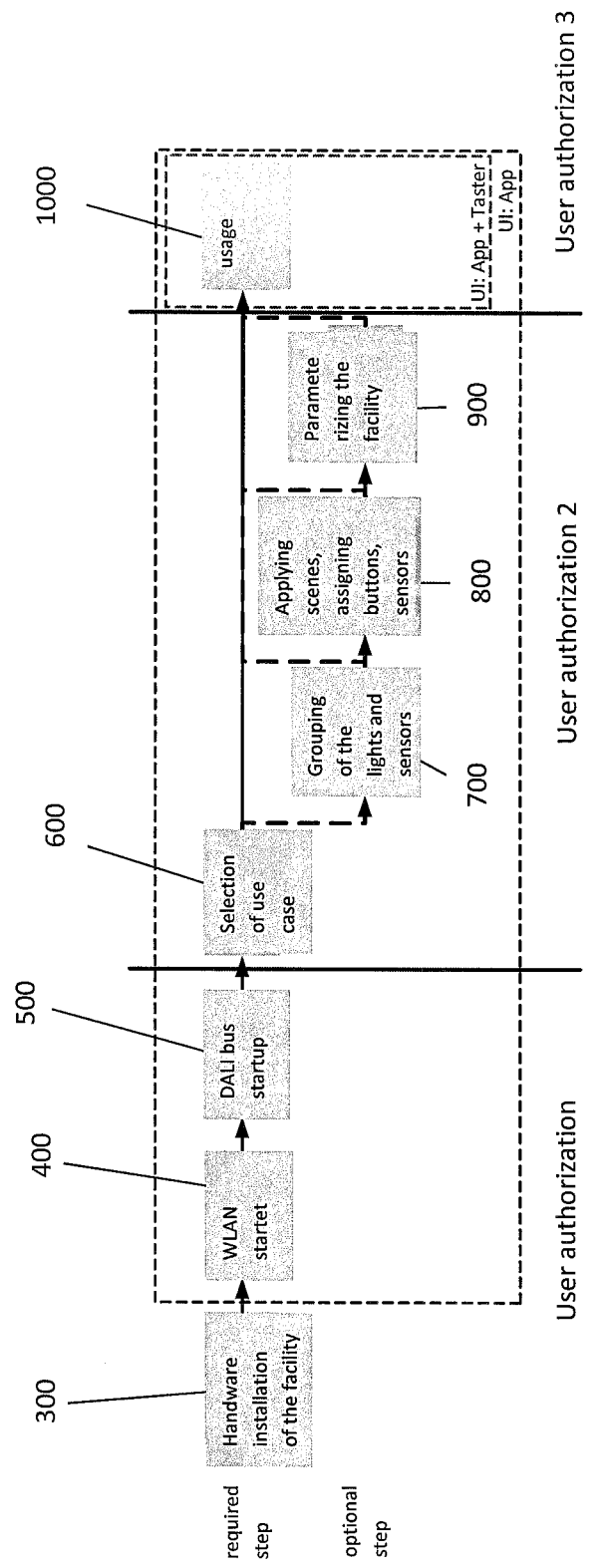
FIG. 6 shows the method according to the invention for the administration and/or configuration and/or startup of a control facility for a lighting system in a flow chart in a schematic illustration.

FIG. 6 shows a flow chart for the construction and the configuration and/or administration according to the invention up to the operation of a control facility for a lighting system, as indicated in FIGS. 4 and 5. After the hardware installation 300 of the entire lighting system, firstly, step 400 with the setup and startup of the WLAN follows. Subsequent step 500 comprises the startup of the respective DALI buses on the control adapters, including the connected DALI devices. In this case, it can first be established in one embodiment whether lights of the lighting system are operated in broadcast or in addressing mode.

Thereafter, in step 600, a computer-assisted detection of all connected DALI devices and a comparison of the detected, i.e., ascertained lighting system construction to stored lighting system templates and a computer-assisted selection of one of these templates for the further configuration and/or parameterization of the lighting system are performed. If only a single lighting system template is provided, no selection has to be performed, instead in this case the one template corresponds to the lighting system template referred to as selected hereafter.

Proceeding from the selected lighting system template, in following steps, the configuration and/or parameterization of the lighting system can then be completed, in particular by user inputs. However, it can also be provided in this case that all data for the configuration and/or parameterization of the system are assumed from the selected lighting system template. For step 700, a grouping of lights and sensors of the lighting system can be performed for this purpose, as is specified in the selected lighting system template. For example, it can be established via this which light sensor and/or presence sensor controls a specific light or light group. Lights can thus also be grouped which are activated together and uniformly after the grouping. In step 800, an assignment of buttons and sensors and the application of light scenes, i.e., chronological sequences, or light situations in which specific light values can be specified, can be performed. In this case, it can be established, for example, which functions a wall button has and how it interacts with a presence detector. In last step 900, the parameterization of the control facility is performed, for example, by input of specified dimming values, threshold values, etc. The control facility is completely configured and parameterized thereafter and can be operated in step 1000, wherein the facility is operated by sensor signals and user inputs at the buttons and/or switches. In addition, it can also be provided that user inputs are performed via a WLAN terminal such as a smartphone.

In the described embodiment, steps 300, 400, and 600-900 and also step 1000 are assigned different user authorizations, which can be secured via respective passwords.

Before individual configuration steps of FIG. 6 will be discussed, the fundamental functionality of the control facility according to the invention is to be described from a software aspect with reference to FIGS. 7*a-c*. The control adapters are provided in this case with the reference signs ISRIi, i=1 ... n. The point in time directly after step 300 of FIG. 6 is considered, i.e., after the hardware installation of the control facility and/or the lighting system. For the sake of simplicity, the assigned software functionalities are identified with the respective devices, wherein the specification "app" indicates the software on the wireless network terminal, in the present embodiment a smartphone, from which the entire administration of the control facility and/or the lighting system can be carried out.

With reference to the functionality provided in each control adapter for controlling the connected DALI operating components, this can be assembled from small functional blocks, which are freely combinable with one another, so that arbitrary functionalities can be implemented via the smartphone application by such a software module interconnection in the control adapter. This modular approach enables greatly varying applications, without new software having to be developed for the control adapter. The smartphone app can show this flexibility openly to the user on the display screen, however, it is also possible to propose lighting system templates to the user, whereby many detail settings are saved for the user and nonetheless arbitrary applications can be set up completely.

Figure 7A:
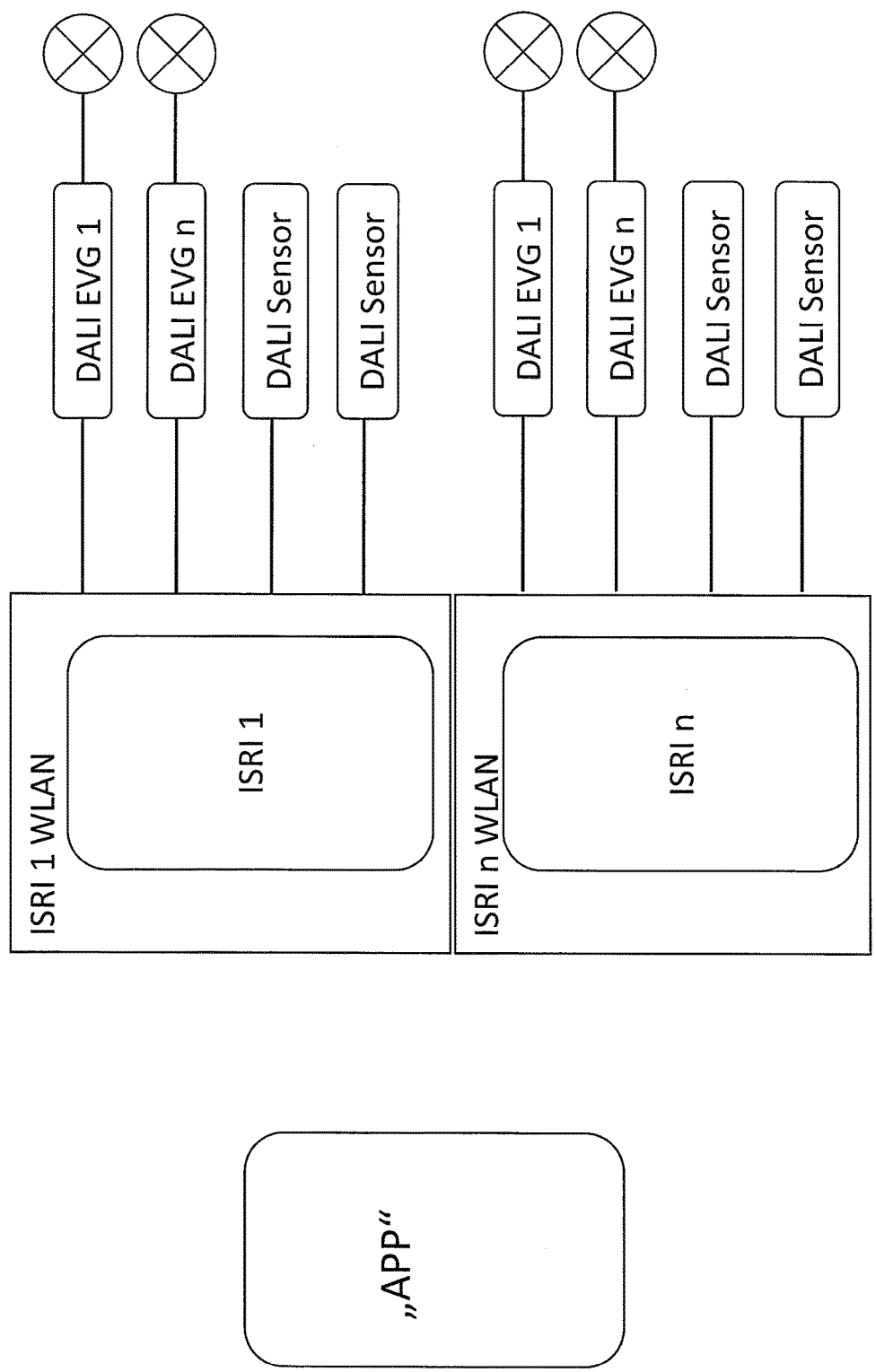

FIG. 7*a* shows the situation after step 300, see FIG. 6. All control adapters are firstly configured in a standard manner as a WLAN access point, i.e., as a base station, so that they can be scanned and displayed accordingly by the smartphone app. FIG. 7*b* shows the step of forming a shared WLAN network by way of the smartphone app, wherein a high level of flexibility is provided for the design of the network, which will be described in greater detail hereafter. In particular, the control adapters can be integrated via the respective WLAN modules thereof into an existing WLAN network by the app, inter alia, with incorporation of user inputs. However, it is also possible that a single control adapter is configured as the base station (access point), to which eight further control adapters can be connected with respect to data according to the relevant WLAN standard. The set-up WLAN configuration is then stored in the control adapters having the separate names for the subsequent communication via the network, in particular for a search for devices in the network (service discovery).

Figure 7C:
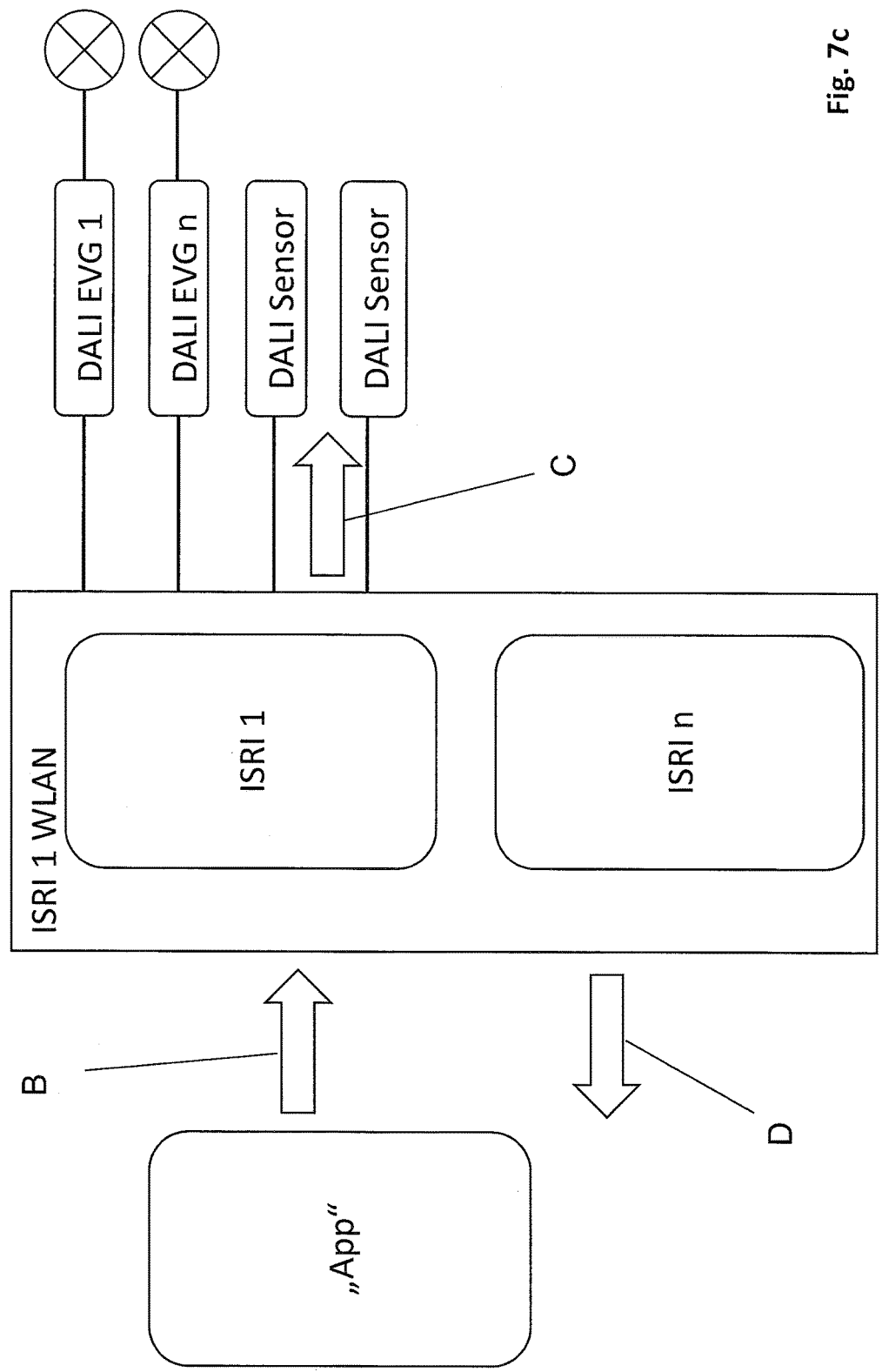

FIG. 7*c* shows the procedure of the request (B) of a scan for DALI devices by the smartphone app to all control adapters, which each carry out the scan (C) on the DALI bus assigned thereto and recognize (detect) the connected DALI devices and transmit them (D) to the smartphone. The control adapters assign addresses in each case for the DALI devices connected to the bus thereof, configure them if necessary, and store the list of the devices. The procedures described with reference to FIGS. 7*a-c* relate to steps 400 and 500 of FIG. 6.

After the setup of the wireless network and the detection of the devices connected to all DALI buses of the control adapters, the lighting system construction thus ascertained is compared, with respect to the comprised control adapters and the devices assigned thereto via the respective DALI bus, to stored lighting system templates according to predetermined criteria.

Such criteria can be, for example, the number and the types of the DALI devices such as sensor types, light types, ballast device types, and/or the number and the type of the WLAN coupling of the comprised control adapters. Such criteria can furthermore comprise types of DALI devices connected to a control adapter, such as switches/buttons, sensor types, light types, ballast device types, and/or the respective numbers thereof.

The lighting system templates can be stored, depending on the embodiment, for example, directly in the smartphone app or in another storage region in the smartphone. However, it is also possible that such a reconciliation is carried out using a databank, which the smartphone can access via a web browser. If a lighting system template is found which has a specified degree of correspondence with the ascertained lighting system construction, in a processor-assisted and fully automatic manner, this lighting system template can be used by the app of the smartphone as the basis of the further configuration and parameterization of the lighting system. In addition, it is also possible that a list having multiple matching lighting system templates is displayed to the user on the smartphone, from which he can select one for the further configuration of the facility of the system.

As explained above, in one embodiment of the invention, only one single lighting system template can be predetermined and stored, so that a selection according to such criteria does not have to be performed.

After the determination of the lighting system template, depending on the specific application, the grouping of lights and sensors specified in accordance with the template, assignment of buttons and sensors, and/or parameterization can then be carried out by the smartphone app in the control adapters automatically, wherein, controlled by the smartphone app, the corresponding software modules are assembled in the control adapters. In another embodiment, these configuration steps can be set at least partially manually via the smartphone app by the user, whereupon the corresponding software modules are then assembled in the control adapters in a manner controlled by the smartphone app.

With reference to FIG. 6, step 400, i.e., the setup and the startup of the WLAN network of the control facility, will be explained in greater detail hereafter, wherein a room-by-room configuration of the facility is advantageous. It is to be noted in this case that the control facility and/or the assigned lighting system can go beyond the examples indicated in FIGS. 4 and 5 of a single open-plan office or a sales floor, for example, it can comprise multiple such rooms having specific partial lighting systems. The administration can also be performed room-by-room in the case of such complex control facilities and/or lighting systems, wherein it is then to be established whether all control adapters are integrated into a single LAN network or whether they are configured independently of one another, wherein a communication is enabled by the provision of corresponding routers.

Step 400, see FIG. 6, firstly comprises the step of scanning the WLAN wireless network frequency range to ascertain WLAN users, which are configured as a base station (access point) or as a wireless router and are additionally recognizable with respect to data as control adapters. As described above, this scanning is performed via the smartphone, or the app running thereon, wherein the WLAN modules of all control adapters are all configured in the standard configuration thereof as a WLAN base station (access point) or as a WLAN hotspot and additionally have a unique, i.e., device-dependent serial number, which is recognizable and displayable in the WLAN, for example, as an SSID (service set identification) during the WLAN scan by the smartphone. Furthermore, all further stations operating as a base station or wireless router or WLAN hotspot are displayed to the user on the smartphone, so that they are available to the user for the setup of a WLAN network or a subnetwork and can be selected and configured.

The selection of the control adapters is advantageously carried out room-by-room. For this purpose, the smartphone app offers the user the possibility of clicking on ascertained control adapters, whereupon the lights or lighting means connected to this control adapter are turned on via the respective DALI bus or emit another light signal, so that the user recognizes whether the part of the facility or the part of the lighting system is located in the present room. If this is the case, the control adapter is selected by the user via the app and configured as a WLAN user of a specific WLAN network or subnetwork. In this manner, a subset of the wireless network users ascertained via the scanning can be selected and configured as a WLAN user associated with a specific WLAN network. If the control facility comprises a lighting system in multiple rooms, the described procedure can be repeated accordingly in each room, for the entire facility to be configured.

In another WLAN configuration, all wireless network users ascertained via the described scanning can also be selected and configured as WLAN users associated with a specific WLAN network.

To prevent the intrusion of unauthorized parties into the WLAN network of the control facility, a respective, self-signed certificate comprising an asymmetrical key pair can be stored in all control adapters, wherein the user is requested by the app, after the marking of the respective control adapter, to input the public key. Depending on the embodiment, this can be carried out via a keyboard of the smartphone or via the scanning of a QR code, which can be attached to the housing of the respective control adapter, for example. The respective control adapter can be selected and integrated into the present WLAN network only after the checking of the input public key in the control adapter. In another embodiment, it can also be provided that the respective public key of the available control adapter is stored directly in the smartphone app or can be downloaded thereby via a secured connection from the Internet, and therefore a verification of the authenticity of the control adapter can be performed without further input of the user.

Figure 8:
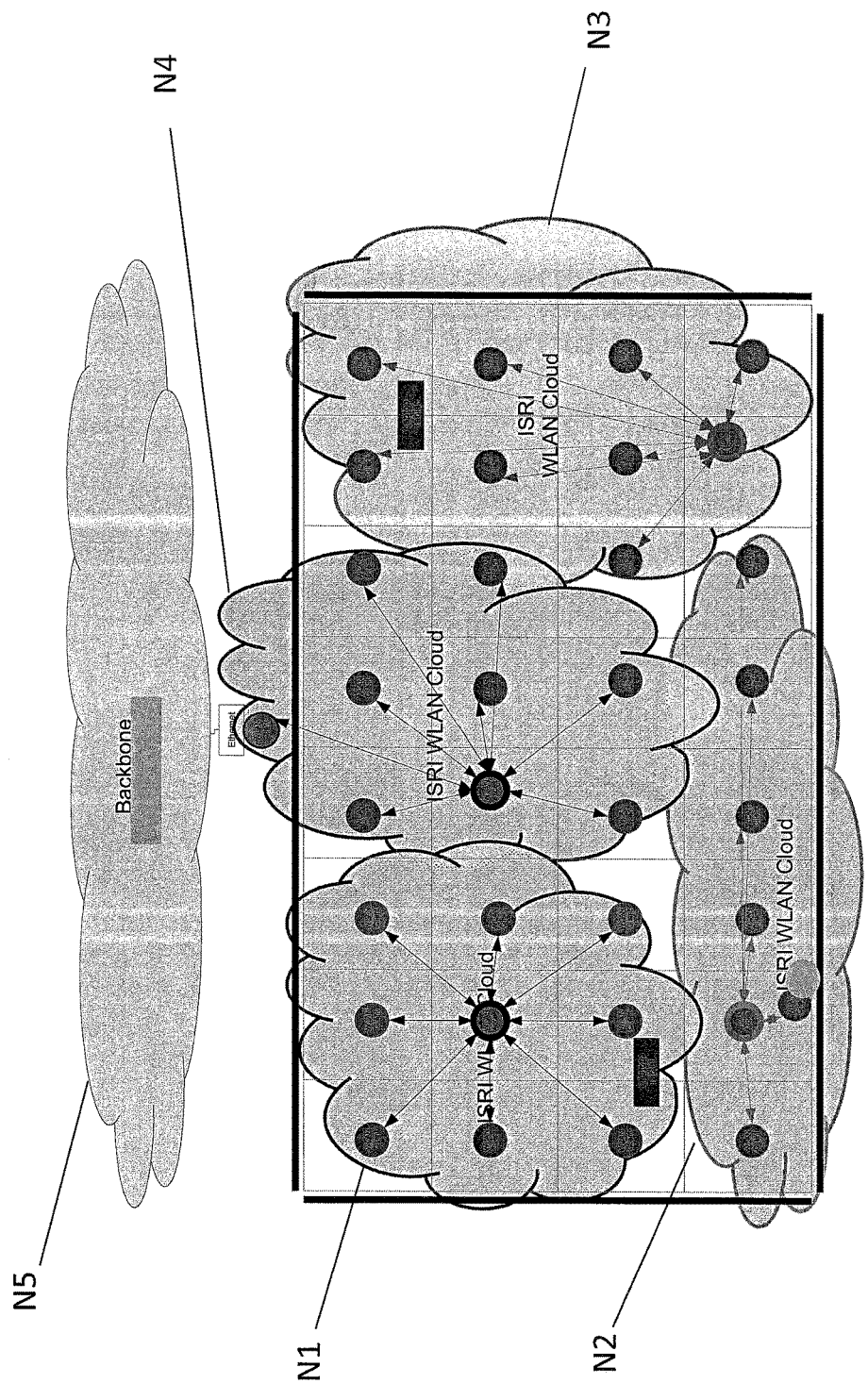
FIG. 8 shows an exemplary WLAN infrastructure of a control facility designed according to the invention.

Step 400 of the configuration of the WLAN and its startup can result in various WLAN infrastructure scenarios. For example, the configuration can be carried out such that in one room, a control adapter acts as a WLAN base station (access point), while, for example, eight further control adapters configured as WLAN clients are connected thereto, wherein the configuration and startup of this lighting system section can be carried out as described above. Using such a design, this subsystem of control facility and/or the lighting system can comprise, for example, at most 9×64 DALI devices. FIG. 8 shows such a WLAN infrastructure, in which the entire system is composed of four such subnetworks N1-N4, wherein these subnetworks are not connected to one another, and only a single one is connected via a router to a company LAN N5. In particular, the system shown in FIG. 4 can be provided by a corresponding WLAN network, identified in FIG. 8 as a WLAN cloud. In such cases, in which the overall system comprises multiple such open-plan offices, individual open-plan offices can be depicted via a subnetwork as described according to FIG. 8. In one embodiment (not shown), it can also be provided that a WLAN coupling is provided between the individual subnetworks, in particular by means of WLAN base stations and WLAN repeaters.

Figure 9:
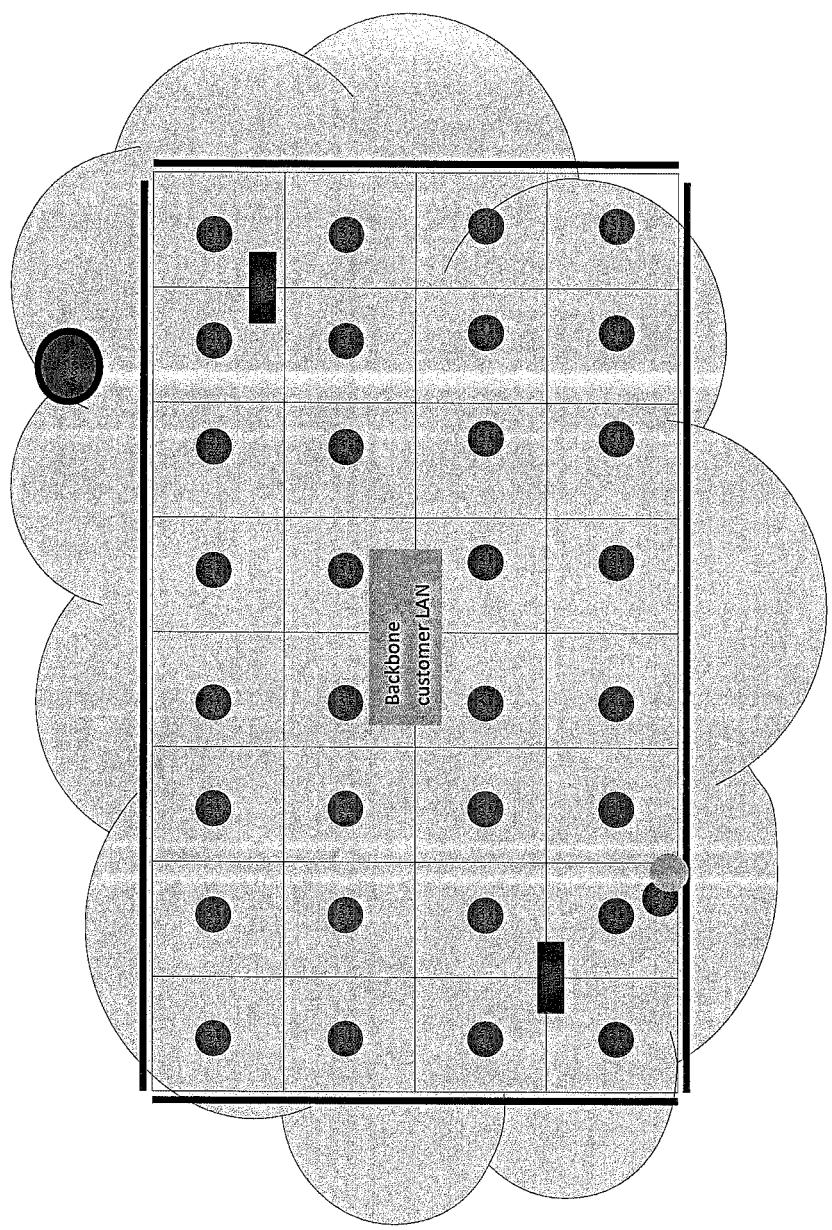
FIG. 9 shows a further WLAN infrastructure for a control facility designed according to the invention.

FIG. 9 shows another embodiment of a configured WLAN infrastructure, in which the control adapters or the WLAN modules thereof, respectively, are all configured as WLAN clients in a company WLAN network. For this purpose, the WLAN access data relevant in the customer network has to be provided to all control adapters.

In addition to the described WLAN infrastructures, still further structures, for example, mixed structures incorporating multiple wireless standards such as 6LowPAN/ZigBee and/or WLAN and/or EnOcean, are also possible. Solely WLAN solutions are preferred, however, in particular in the case of larger installations as a result of the avoidance linked thereto of required device variants and reduction of the planning and installation complexity. Using the described WLAN structures, any type of installation situations can be depicted, in particular control facilities and/or lighting systems for halls such as logistics halls or construction markets having areas of several thousand square meters, open-plan offices, single room installations, school classes, etc., wherein the respective overall system can also extend over multiple floors of a building. As explained, an adaptation to more complex room geometries can be provided by the use of repeaters. In a further embodiment (not shown), a WLAN coupling of the control adapters can also be carried out using a so-called meshing.

The method according to the invention after carrying out steps 300 to 600 according to FIG. 6 will be explained in greater detail hereafter with reference to following FIGS. 10 to 14 for the case of an embodiment of the invention in which a single lighting system template is predetermined, according to which or on the basis of which the further configuration and/or assignment of the components and/or parameterization of the lighting system is performed. To simplify the illustration, it is presumed in this case that control facility according to the invention comprises a single control adapter, to which, as described, a plurality of light-technology operating components such as control gear, ballast devices, sensor units, and/or switch units are connected. In this embodiment, the digital control bus is again designed as a DALI bus, so that a maximum number of 64 operating components are connectable, which is sufficient in a variety of applications, for example, for the design of a lighting system in small or moderate-sized rooms such as classrooms, office spaces, office rooms, etc. It is presumed hereafter in this case that the configuration of the lighting system is performed as described on a wireless network/terminal, wherein it is designed in the present case as a tablet.

Figure 10:
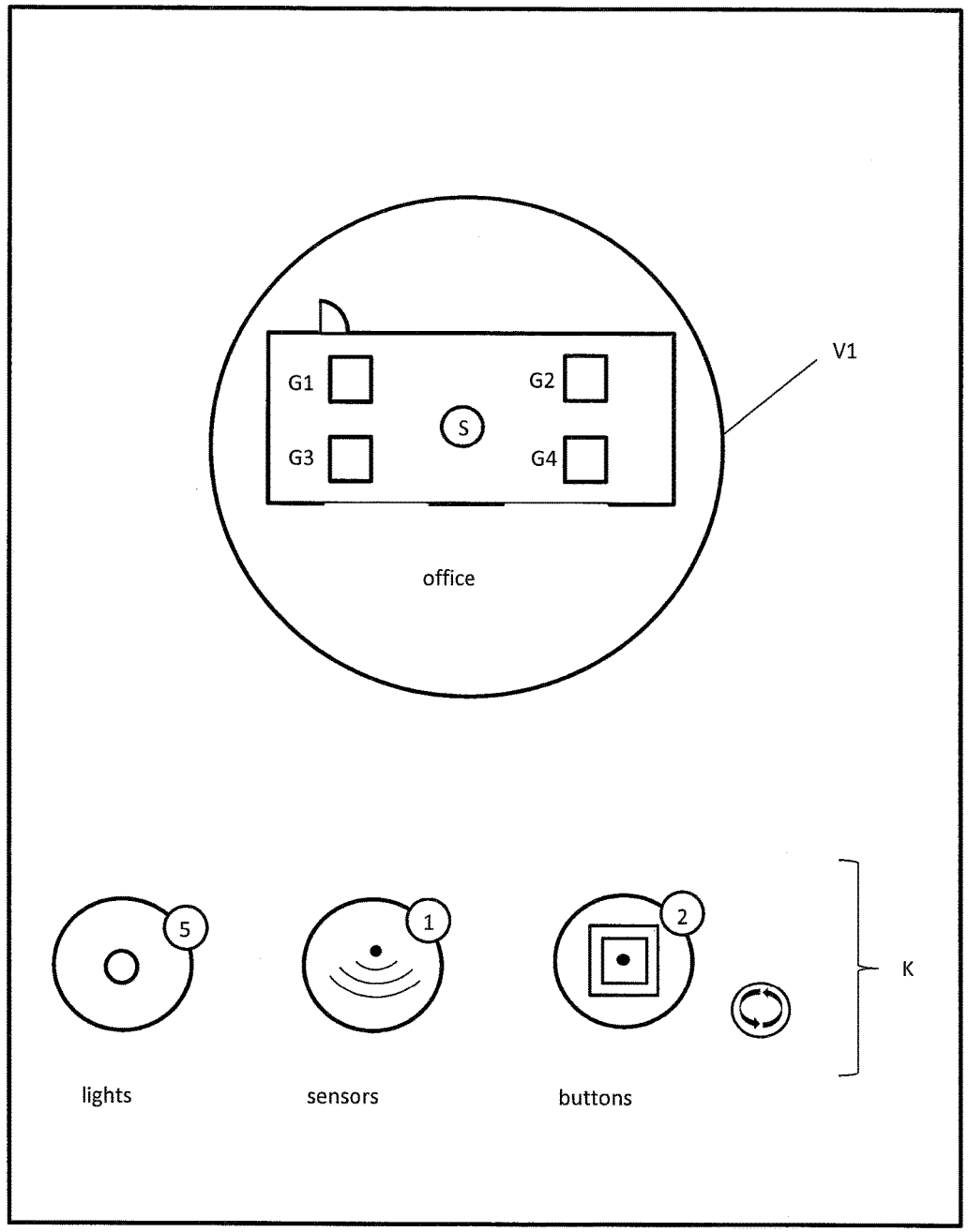
FIG. 10 shows an exemplary visualization of a lighting system template together with detected operating components on a display screen of a wireless network terminal for interactive configuration of the lighting system.

According to step 300 of FIG. 6, all light-technology operating components which are connected by means of the digital control bus to a single control adapter are detected and identified by a DALI scan of the control adapter, transmitted to the tablet or the app running thereon, and visualized thereby on the display screen of the tablet together with the lighting system template V1, see FIG. 10. The lighting system template V1 recognizably has four lighting groups G1 to G4 and a sensor S. In the line K of the display screen, five lights, a sensor S, and two button units T are displayed as the detected light-technology operating components.

After the detection, the light-technology control gear can be activated by the control adapter, in particular for optical signaling, so that the user can recognize where in the room the respective component is located. Using the icon displayed on the right adjacent to the button, the user can initiate the scanning procedure on the DALI bus of the control adapter.

Figure 11:
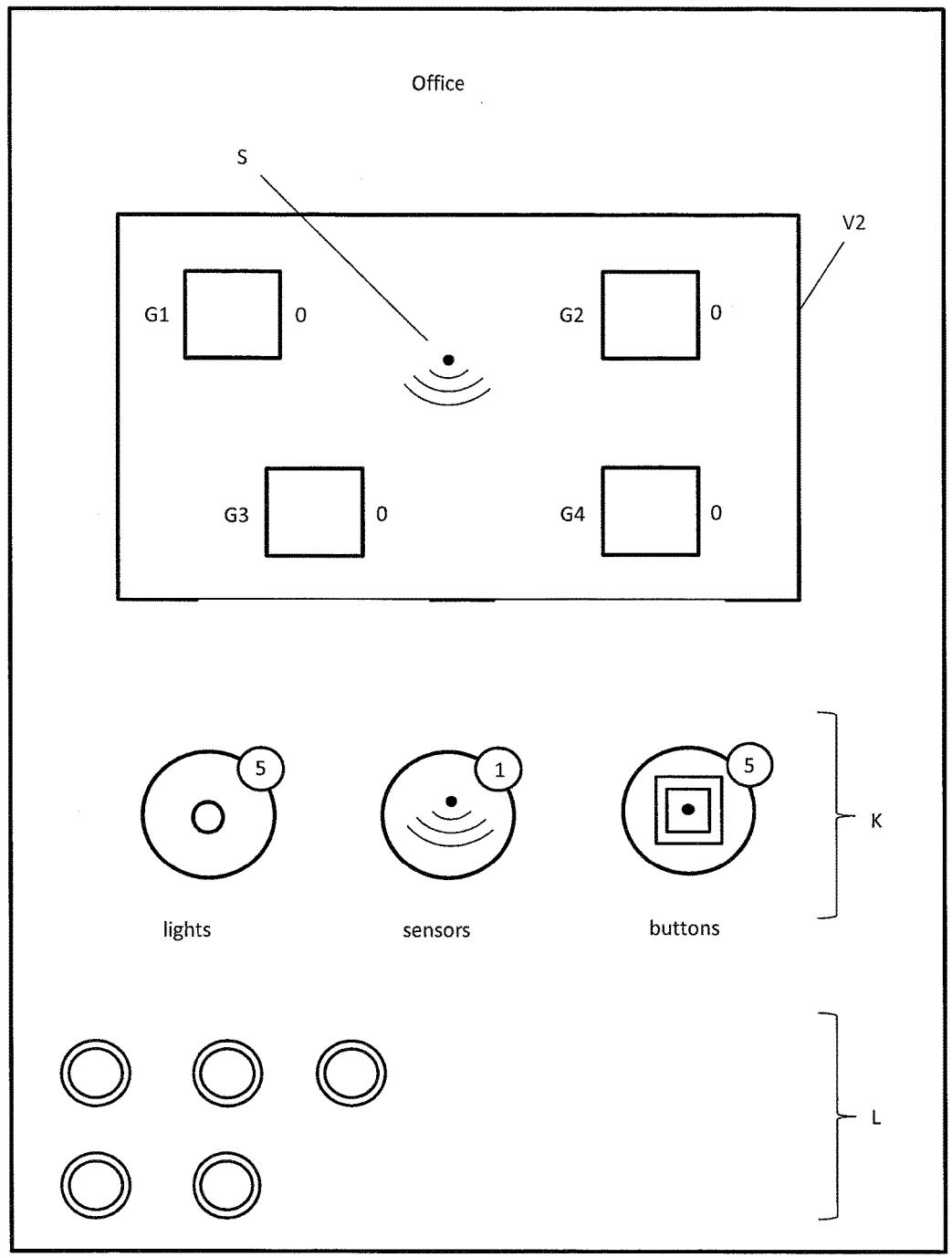
FIG. 11 shows a further visualization corresponding to FIG. 10 for the grouping of the detected lights according to the lighting system template.
Figure 12:
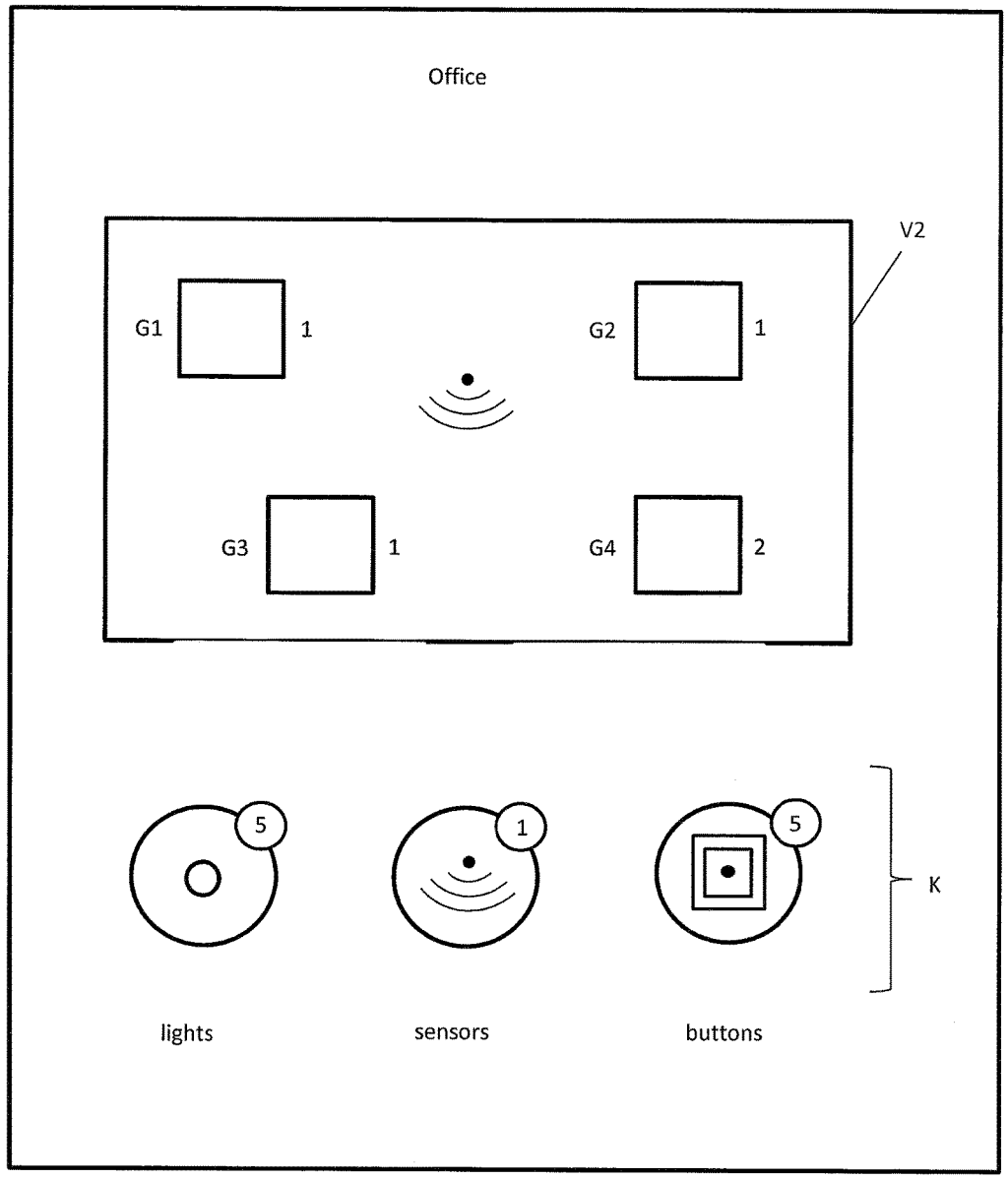
FIG. 12 shows a further visualization corresponding to FIG. 11, in which the detected lights are grouped.

By selecting the lighting system template V1 according to FIG. 10, the user reaches the menu shown in FIG. 11 or the visualization shown therein, on the basis of which an assignment of lights, sensors, and buttons of the present lighting system to the operating components in this regard of the lighting system template V1 are assigned. In the visualization V2 of the lighting system template shown in FIG. 11, in addition to the four light groups G1 to G4, the number of the already assigned lights of the real lighting system are each also displayed, which are again visualized in the line K. In addition, in the illustration according to FIG. 11, the lower section L, which shows the visualized lights individually, five icons or symbols are each indicated, by the selection of which the respective light can be activated for signaling. This visualization of the individual lights in the section L can be controlled in the described embodiment by selection of the icon "light" in the visualization line K.

The user can now select an individual one of the light symbols indicated in the region L on the display screen and assign the respective real light on the basis of the signaling thus caused to one of the four light groups G1 to G4, in that the respective light icon is drawn into a lamp group G1 to G4 selected by the user by a conventional drag-and-drop procedure. The presently grouped lights in the respective group are displayed in the visualization according to FIG. 11 by a corresponding number at the group icons G1 to G4. Sensors and buttons can be assigned in a similar manner, so at the end of the assignment procedure of the operating components of the lighting system to the operating components of the lighting system template, the image indicated in FIG. 12 results on the display screen of the tablet. An assignment of lamps to one of the four indicated groups G1 to G4 can be canceled in that the relevant group icon is selected, whereupon the lights assigned to the group are visualized in a similar manner as shown in FIG. 11. By selecting a light icon, the respective light is energized for signaling and can then be removed from the group by the user by deleting the icon.

In one embodiment (not described in greater detail), it can also be provided that a lighting system template can be reworked by the user, for example, by deleting or adding light-technology operating components, such as lights, sensors, and/or switches. This also applies in particular to groups of lights.

Figure 13:
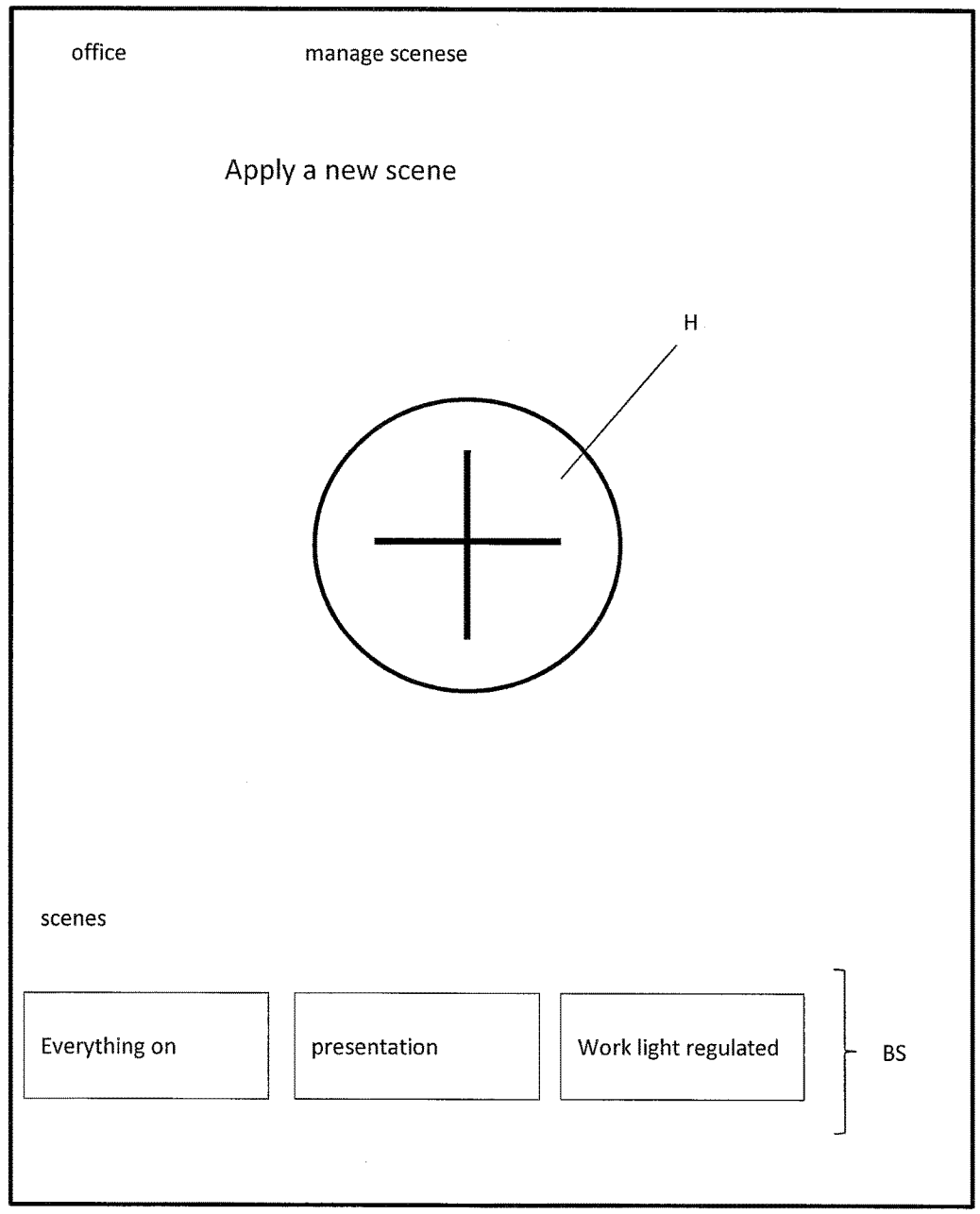
FIG. 13 shows a further visualization corresponding to FIGS. 10, 11, and 12, in which lighting scenes are manageable.

After the assignment of the operating components connected to the digital bus of the control adapter is completed, lighting scenes and/or lighting situations can be managed, in particular configured and/or parameterized, added, and deleted, using the following submenu "manage scenes", see FIG. 13. Such lighting situations or scenes relate, for example, to establishing dimming factors for individual lights and/or light groups and/or establishing a shutdown time of a presence sensor after a presence detection.

Figure 14:
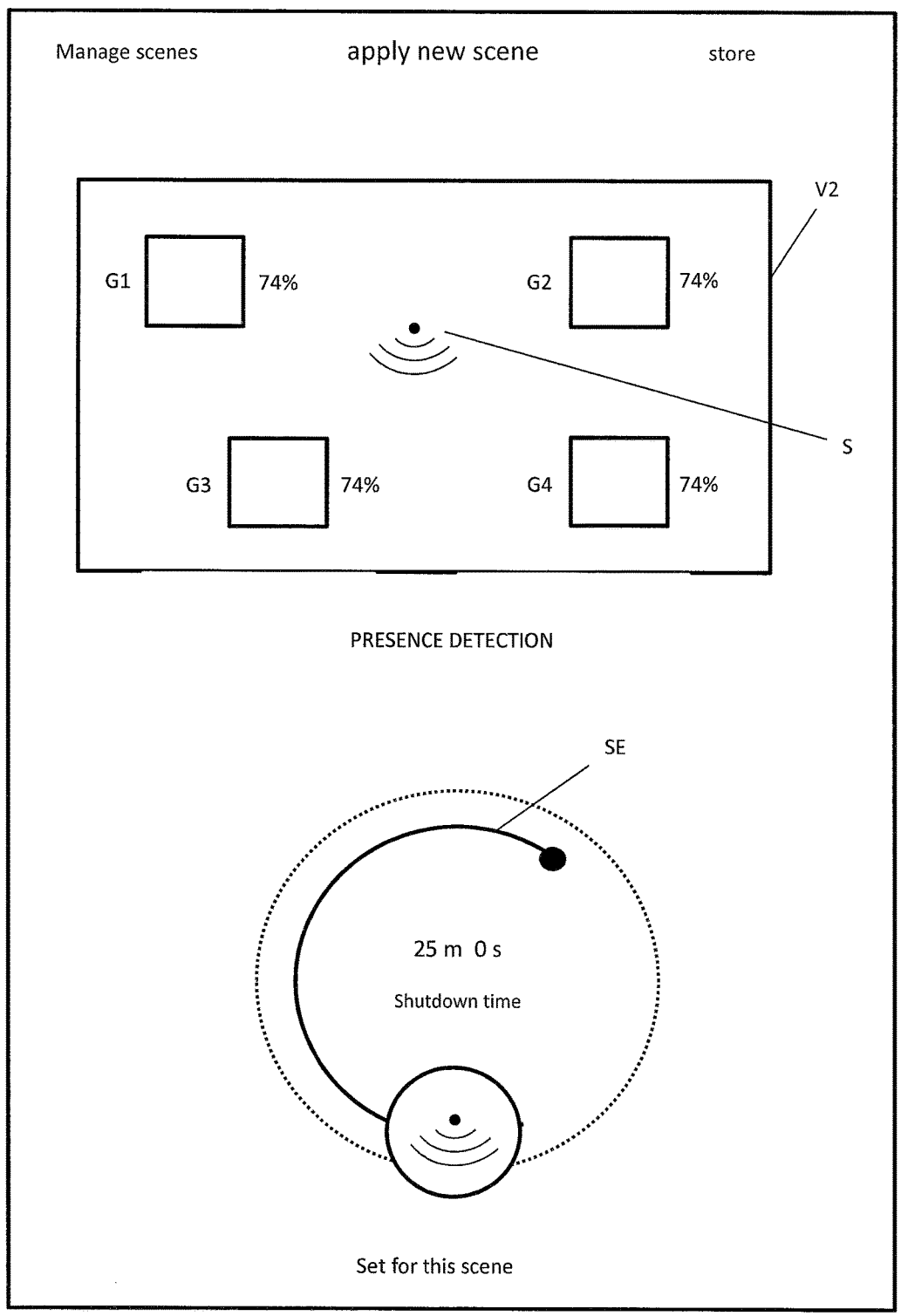
FIG. 14 shows a visualization corresponding to FIG. 13, in which a new lighting scene can be set up interactively.

FIG. 14 shows the graphically assisted input of the shutdown time of the present sensor S for a newly applied lighting scene, in which all light groups are dimmed to 74%. These dimming values are also made settable by simple selection of the respective group icon. In a similar manner, a button assignment can be carried out, in particular with regard to the selection of one of the set-up lighting scenes or situations.

In one special embodiment, it can be provided that an offset regulating behavior of a lighting system is provided in a set and selectable lighting scene, wherein fundamentally at least one light group or one light is automatically dimmed by the control facility as a function of the sensor signal of a light sensor. Because a predefined target luminous flux generally cannot be measured at the location at which this luminous flux is to be provided, a calibration of the light sensor using a handheld sensor at the location of the target luminous flux, for example, a work surface, can advantageously be carried out during the configuration and/or parameterization of the control facility. In this case, the lights or light groups are changed with respect to the dimming level thereof enough that the handheld sensor indicates the desired luminous flux on the exemplary work surface. The sensor value then resulting at the light sensor of the lighting system can be used as a target value during the subsequent control of the dimming level, for example, to provide a consistency of the luminous flux on the work surface essentially independently of external conditions such as daylight states.

If the lighting system has at least two light groups, in the described embodiment, both light groups are automatically dimmed by the control facility as a function of the sensor signal of the light sensor. The calibration of the sensor is performed as just described, wherein a dimming level results or is set by the user for each of the two light groups and these dimming levels can be different. The sensor value then in turn resulting at the light sensor of the lighting system can be used during the subsequent control of the dimming level of the two light groups as a target value, for example, to provide a consistency of the luminous flux on the work surface substantially independently of external conditions such as daylight states. In this case, the regulation of the dimming level can be performed so that difference set during the calibration of the light sensor in the dimming levels can be maintained during the regulation in a predefined range of the dimming levels. For example, if a dimming level of 80% for the first light group and 70% for the second light group was ascertained when ambient light is not present, this difference of 10% thus remains fixed if, as a result of the occurrence of ambient light, both dimming levels are lowered by the controller. It can also be provided in this case that this difference in the dimming levels of the two light groups is kept consistent until the dimming level of one light group has a predefined minimum value, thereafter, during the further dimming down by the controller as a result of increased ambient light, solely the dimming level of the second light group is lowered to the minimum value. The setting or configuration can also be performed as described here by the user on the display screen of the terminal.

After the configuration of the control facility of the lighting system, via the app of the tablet, the respective software modules for controlling the light-technology operating components connected to the control adapter can subsequently be assembled to form specific operating software for the control adapters, wherein such a software module can be provided for each light-technology operating component and/or for one or more functions of such an operating component.

LIST OF REFERENCE SIGNS 1 control facility
10 button
20-23 light
24 light sensor
25 switch
26 presence sensor
27 DALI bus
30 table
100 control adapter
110 WLAN module
120 DALI module
130 controller
140 button input
150 system clock unit
160 expansion module
200 smartphone
300 installation of the lighting system
400 setup and startup of WLAN
500 setup and startup of DALI bus
600 selection of lighting system template for further configuration
700 copying of light/sensors
800 assignment of buttons/sensors
900 parameterization
1000 operation
B, S lighting scene
$G_i$,
i=1 . . . n icon group of lights
H adding
L icon of lights
$L_i$,
I=1 . . . 5 icon of light
K icon of operating components
S icon of sensors
SE icon of sensor setting
T icon of buttons
V1, V2 visualized lighting template

What is claimed is:

1. A control facility for a lighting system comprising:
at least one control adapter having a digital interface for connection to an assigned digital control bus, to which a plurality of light-technology operating components are connectable as bus users by a respective digital interface;
wherein the at least one control adapter furthermore has a controller and a wireless interface for data coupling of the at least one control adapter to a wireless network terminal;
wherein, for a plurality of lighting system templates, for each of said templates, the light-technology operating components and at least some configurations and/or parameterizations assigned to the light-technology operating components are stored in a memory, which is readable by the wireless network terminal; and
wherein, for a configuration and a startup of the lighting system, all bus users connected to the digital control bus are detected, and one of said plurality of lighting system templates having a predefined configuration and/or parameterization of the light-technology operating components is ascertainable in a computer-assisted manner by comparison of the detected light-technology operating components to the light technology operating components stored for the plurality of lighting system templates, which lighting system template is used as a basis for a following further configuration and/or parameterization of the lighting system.

2. The control facility according to claim 1, wherein the memory for storing the light-technology operating components by the at least one or the plurality of lighting system templates and at least some of the configurations and/or parameterizations assigned to the light-technology operating components is arranged in the wireless network terminal.

3. The control facility according to claim 1, wherein target values and/or functionalities for detected light-technology operating components are inputable via the wireless network terminal.

4. The control facility according to claim 1, wherein lighting scenes are inputable via the wireless network terminal.

5. The control facility according to claim 1, wherein the control facility has a plurality of control adapters having a digital interface for connection to an assigned digital control bus, a controller, and a wireless interface, wherein the plurality of control adapters are users of the wireless network, configured as a wireless client, wireless base station (wireless access point), and/or as a wireless router, and wherein the wireless network is a WLAN network.

6. A method for a configuration and/or a startup of a control facility for a lighting system having at least one control adapter having a digital interface for connection to an assigned digital control bus, to which a plurality of light-technology operating components are connected by a respective digital interface as bus users, wherein the at least one control adapter furthermore has a controller and a wireless interface for data coupling of the at least one control adapter to a wireless network terminal, the method comprising the following steps:
- setting up a wireless network comprising the at least one control adapter as a wireless network user;
- detecting the light-technology operating components connected to the digital control bus of a control adapter for the at least one control adapter which is networked in the wireless network;
- comparing the ascertained lighting system construction to stored plurality of lighting system templates according to predetermined criteria; and
- in response to the comparison, selecting a lighting system template from said stored plurality of lighting system templates, wherein configuration and/or parameterization of the lighting system is carried out according to the selected lighting system template.

7. The method according to claim 6, wherein the following step precedes the step of selecting a lighting system template:
- identifying a lighting system template having the greatest correspondence according to the predetermined criteria.

8. The method according to claim 6, wherein the following step precedes the step of selecting a lighting system template:
- identifying a plurality of stored lighting system templates having the greatest correspondence according to the predetermined criteria and listing lighting system templates according to the extent of the correspondence with respect to the predetermined criteria.

9. The method according to claim 8, wherein the lighting system template for configuring the lighting system is selected manually from the list.

10. The method according to claim 6, wherein the configuration of a wireless network comprises the following steps:
- scanning a specified wireless network frequency range to ascertain wireless network users, which are configured as a base station (wireless access point) or wireless router and are recognizable with respect to data as control adapters by specification of a unique identifier assigned to a control adapter; and
- selecting a subset or all ascertained control adapters and configuring the selected control adapters as wireless network users associated with the specific wireless network.

11. The method according to claim 10, wherein the step of selecting control adapters comprises, for each ascertained control adapter:
- displaying the ascertained control adapter on a display screen by an assigned symbol;
- marking of a symbol assigned to the control adapter on the display screen by a user;
- activating the control adapter marked on the display screen to emit an optical and/or acoustic signal; and
- in response to the signal, selecting of the control adapter by the user as a control adapter associated with the wireless network.

12. The method according to claim 10, wherein a plurality of the selected control adapters are each reconfigured as a client within the specific wireless network.

13. The method according to claim 6, during the configuration of a wireless network, the authenticity of an ascertained control adapter is verified by user input and/or reading in a public key assigned to the control adapter.

14. The method according to claim 6, wherein a self-signed certificate comprising a private key and a public key is stored on the control adapters for encrypting communication data.

15. The method according to claim 6, wherein after the finishing of the configuration and/or parameterization of the lighting system, configuration data and/or parameterization data of the lighting system are used to update and/or expand a stored lighting system template, or items of information on the lighting system are stored with the associated configuration data and/or parameterization data as a further lighting system template.

16. The method according to claim 6, wherein geometrical specifications about a room design and specifications about at least one group of lights arranged in the room and also at least one sensor unit and/or one switch unit are stored in the at least one lighting system template.

17. The method according to claim 6, wherein after the configuration of the control facility, an interconnection of a plurality of software modules to create a control program for the at least one control adapter is carried out automatically and in a program-controlled manner as a function of the operating components connected to the control adapter and the configuration thereof.

18. A non-transitory computer-readable storage medium, on which a program code is stored for a wireless network terminal for executing the method according to claim 6.

19. A non-transitory computer-readable storage medium, on which a program code is stored for a control adapter for executing the method according to claim 6.

20. A wireless network terminal such as a smartphone or a notebook, having a display screen and an input unit and also having a storage medium according to claim 18.

21. A control adapter having a controller, a wireless interface for data coupling of the control adapter to a wireless network terminal, a digital interface for connection to an assigned digital control bus, and also having a storage medium according to claim 19.

* * * * *